US009521347B2

(12) United States Patent
Kawanabe et al.

(10) Patent No.: US 9,521,347 B2
(45) Date of Patent: Dec. 13, 2016

(54) RADIATION IMAGING APPARATUS AND RADIATION IMAGING SYSTEM

(71) Applicant: CANON KABUSHIKI KAISHA, Tokyo (JP)

(72) Inventors: Jun Kawanabe, Kumagaya (JP); Minoru Watanabe, Honjo (JP); Keigo Yokoyama, Honjo (JP); Masato Ofuji, Takasaki (JP); Kentaro Fujiyoshi, Tokyo (JP); Hiroshi Wayama, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 41 days.

(21) Appl. No.: 14/692,856

(22) Filed: Apr. 22, 2015

(65) Prior Publication Data

US 2015/0319382 A1 Nov. 5, 2015

(30) Foreign Application Priority Data

May 1, 2014 (JP) ................................. 2014-094874

(51) Int. Cl.
*H04N 5/378* (2011.01)
*H04N 5/359* (2011.01)
*H04N 5/32* (2006.01)
*G01T 1/17* (2006.01)

(52) U.S. Cl.
CPC ................. *H04N 5/378* (2013.01); *G01T 1/17* (2013.01); *H04N 5/32* (2013.01); *H04N 5/359* (2013.01)

(58) Field of Classification Search
USPC ........................................................ 378/98.8
See application file for complete search history.

(56) References Cited

U.S. PATENT DOCUMENTS

| | | | | |
|---|---|---|---|---|
| 7,386,089 | B2 | 6/2008 | Endo et al. | 378/5 |
| 7,408,167 | B2 | 8/2008 | Kameshima et al. | 250/370.09 |
| 7,535,506 | B2 | 5/2009 | Nomura et al. | 348/308 |
| 7,541,591 | B2 | 6/2009 | Endo et al. | 250/369 |
| 7,541,617 | B2 | 6/2009 | Mochizuki et al. | 257/72 |
| 7,897,930 | B2 | 3/2011 | Mochizuki et al. | 250/370.09 |
| 7,932,946 | B2 | 4/2011 | Ishii et al. | 348/294 |
| 8,368,027 | B2 | 2/2013 | Ishii et al. | 250/370.08 |
| 2006/0062352 | A1* | 3/2006 | Nomura | H01L 27/14603 378/98.8 |
| 2012/0049077 | A1 | 3/2012 | Okada | 250/370.08 |
| 2013/0194239 | A1* | 8/2013 | Kato | H01L 27/14636 345/175 |

FOREIGN PATENT DOCUMENTS

| | | |
|---|---|---|
| JP | 2012-052896 | 9/2012 |

* cited by examiner

*Primary Examiner* — Kiet T Nguyen
(74) *Attorney, Agent, or Firm* — Fitzpatrick, Cella, Harper & Scinto

(57) ABSTRACT

A radiation imaging apparatus includes a plurality of conversion elements configured to convert radiation into an electric signal to obtain a radiation image, a sensor for monitoring radiation, a processing unit configured to process signals output from output electrodes of the plurality of conversion elements and an output electrode of the sensor, and a shield. The signal output from the output electrode of the sensor is supplied to the processing unit via a signal line. The shield is arranged such that capacitive coupling between the output electrodes of the plurality of conversion elements and the signal line is reduced.

10 Claims, 21 Drawing Sheets

RADIATION IMAGING APPARATUS AND RADIATION IMAGING SYSTEM

BACKGROUND OF THE INVENTION

1. Field of the Invention

The present invention relates to a radiation imaging apparatus and a radiation imaging system.

2. Description of the Related Art

Radiation imaging apparatuses having arrays of pixels in which switches such as TFTs (thin film transistors) and conversion elements such as photoelectric conversion elements are combined have been put to practical use as radiation imaging apparatuses used for medical imaging diagnosis and non-destructive examination by means of radiation such as X-rays.

In recent years, consideration has been given to increasing the functions of radiation imaging apparatuses. One way of increasing the functions that has been considered is including a function of monitoring the emission of radiation. For example, this function enables detection of the timing at which emission of radiation from a radiation source starts, detection of the timing at which the emission of the radiation is to be stopped, and detection of the irradiation amount or the integrated irradiation amount of the radiation.

Japanese Patent Laid-Open No. 2012-52896 discloses a radiation image capturing apparatus that includes a pixel for capturing a radiation image and a pixel for detecting radiation (a pixel for detecting the start of emission of radiation). The signal of the pixel for capturing a radiation image and the signal of the pixel for detecting radiation are detected via the same signal line.

With the apparatus disclosed in Japanese Patent Laid-Open No. 2012-52896, in order to detect the start of emission of radiation, it is necessary to detect a signal that appears in the signal line in a state in which radiation is being emitted. Here, in the state in which radiation is emitted, the potential of the lower electrode of the pixel for capturing a radiation image changes. Since there is a significant parasitic capacitance between the lower electrode and the signal line, when the potential of the lower electrode of the pixel for capturing a radiation image changes, the potential of the signal line changes due to capacitive coupling (i.e., crosstalk) between the lower electrode and the signal line. Accordingly, in addition to changing due to signals from the pixel for detection radiation, the potential of the signal line also changes due to capacitive coupling with the lower electrode of the pixel for capturing a radiation image. In Japanese Patent Laid-Open No. 2012-52896, there is no acknowledgment of the above-mentioned problem, nor is there any disclosure regarding a countermeasure against such a problem.

SUMMARY OF THE INVENTION

The present invention provides a technique that is advantageous for more accurately monitoring radiation and reducing crosstalk from a pixel for obtaining a radiation image to a sensor for monitoring radiation.

One of aspects of the present invention provides a radiation imaging apparatus, comprising: a plurality of conversion elements configured to convert radiation into an electric signal to obtain a radiation image; a sensor for monitoring radiation; a processing unit configured to process signals output from output electrodes of the plurality of conversion elements and an output electrode of the sensor; and a shield, wherein the signal output from the output electrode of the sensor is supplied to the processing unit via a signal line, and the shield is arranged such that capacitive coupling between the output electrodes of the plurality of conversion elements and the signal line is reduced.

Further features of the present invention will become apparent from the following description of exemplary embodiments with reference to the attached drawings.

DESCRIPTION OF THE EMBODIMENTS

Hereinafter, the present invention will be described via exemplary embodiments thereof, with reference to the accompanying drawings.

Figure 1:
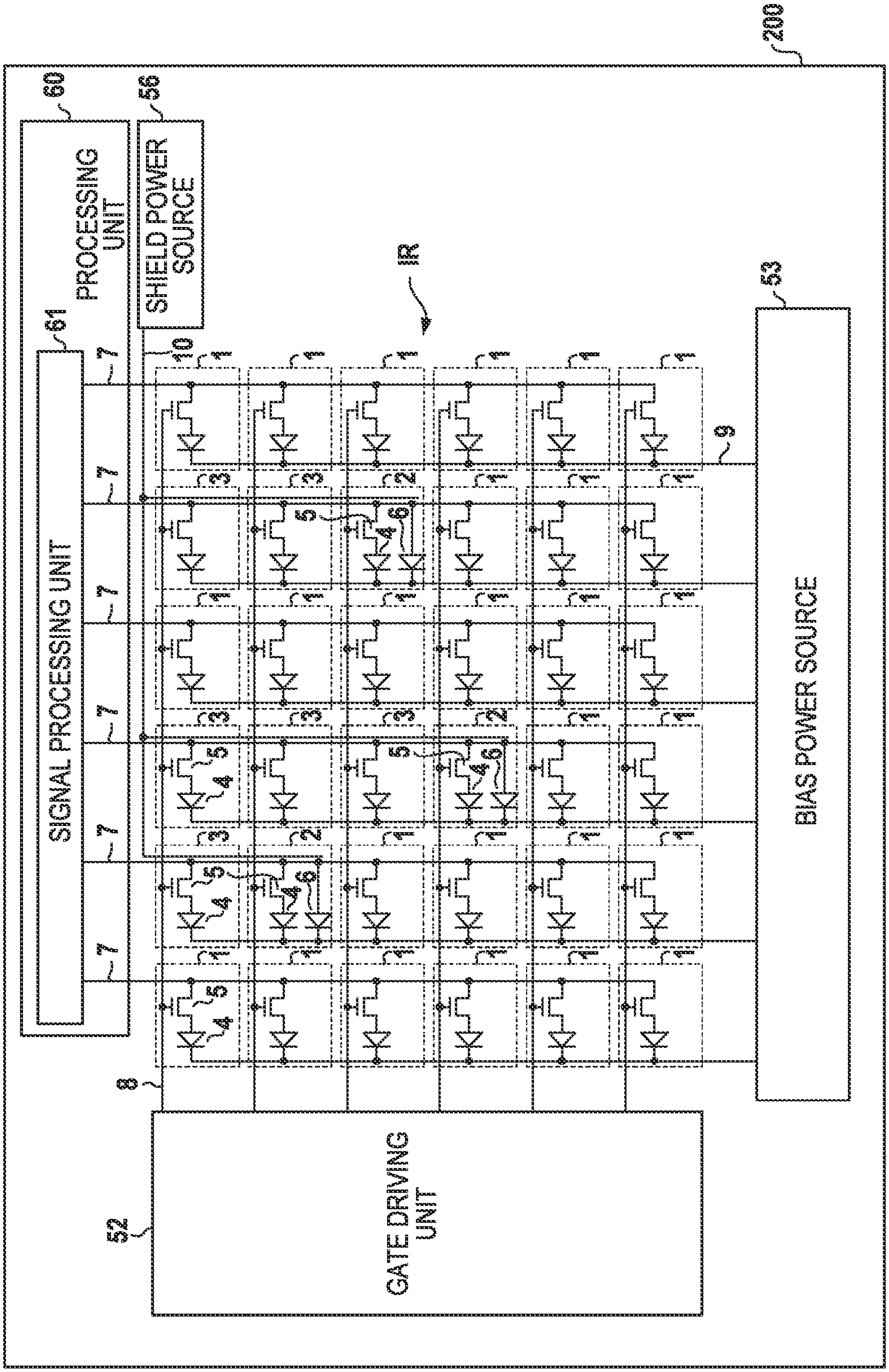
FIG. 1 is a diagram showing a configuration of a radiation imaging apparatus according to a first embodiment of the present invention.

FIG. 1 shows a configuration of a radiation imaging apparatus 200 according to a first embodiment of the present invention. The radiation imaging apparatus 200 has multiple pixels that are arrayed in an imaging area IR so as to form multiple rows and multiple columns. The multiple pixels include a first pixel 1, a second pixel 2, and a third pixel 3. In the example shown in FIG. 1, the pixels are arrayed so as to form six rows and six columns, but this is for the sake of convenience of illustration, and in actuality, more pixels can be arrayed.

The first pixel 1, the second pixel 2, and the third pixel 3 are pixels with mutually different structures. The first pixel 1, the second pixel 2, and the third pixel 3 each include a conversion element 4 that converts radiation into an electric signal, and a switch 5 that is arranged between a column signal line (signal line) 7 and the conversion element 4. The switch 5 can be constituted by a TFT (thin film transistor). A gate line 8 that is driven by a gate driving unit 52 is connected to the control electrode (gate electrode) of the switch 5. Here, one gate line 8 is connected in common to the pixels in one row. Note that the direction in which the gate line 8 extends is the row direction, and the direction in which the column signal line 7 extends is the column direction.

The signal output from the output electrode of the conversion element 4 is transmitted to a processing unit 60 (signal processing unit 61) via the switch 5 and the column signal line 7. The second pixel 2 further includes a sensor 6 for monitoring radiation. A signal output from the output electrode of the sensor 6 is transmitted to the processing unit 60 (signal processing unit 61) via the column signal line 7. The second pixel 2 and the third pixel 3 each include a shield 10. The shield 10 is arranged such that capacitive coupling between the output electrodes of the conversion elements 4 and the column signal line 7 is reduced. A fixed potential is supplied from a shield power source 56 to the shield 10. The shields 10 of a second pixel 2 and third pixel 3 arranged in one row are connected to each other and are connected to the shield power source 56.

The conversion element 4 and the sensor 6 can be formed using a scintillator that converts radiation into light and a photoelectric conversion element that converts the light into an electric signal. The scintillator can usually be formed in a sheet shape so as to cover the imaging area IR, and it can be shared by multiple pixels (multiple conversion elements 4 and one or more sensors 6). The photoelectric conversion element can be a PIN photoelectric conversion element, for example. Alternatively, the conversion element 4 and the sensor 6 can be constituted by a conversion element that converts radiation directly into light. A bias potential is supplied from a bias power source 53 via a bias line 9 to the conversion element 4 and the sensor 6.

One electrode of the conversion element 4 and one electrode of the sensor 6 are connected to the bias power source 53 via the bias line 9, and the output electrodes, which are the other electrodes thereof, are connected to the processing unit 60 (signal processing unit 61) via the column signal line 7. If the conversion element 4 and the sensor 6 are constituted by a scintillator and a photoelectric conversion element, upon receiving radiation, the scintillator emits visible light. When the visible light is incident on the photoelectric conversion element, an electron and an electron hole are generated by photoelectric conversion. One of the electron and the electron hole moves to the output electrode, whereby an electric signal appears in the column signal line 7. This electric signal is read out by the signal processing unit 61.

Figure 2:
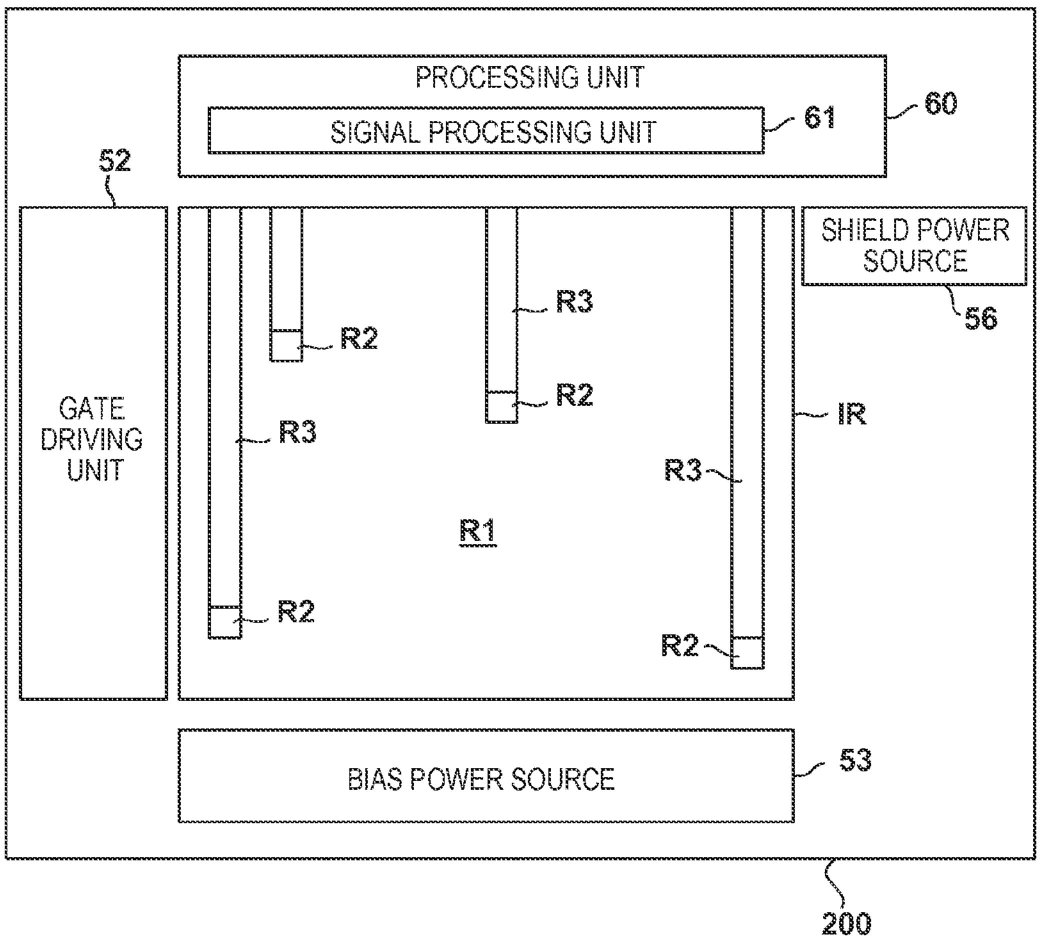
FIG. 2 is a diagram showing an example of an arrangement of first pixels, second pixels, and third pixels according to the first embodiment of the present invention.

FIG. 2 shows an example of an arrangement of the first pixels 1, the second pixels 2, and the third pixels 3 according to the first embodiment of the present invention. The first pixels 1 are arranged in a first area R1, the second pixels 2 are arranged in second areas R2, and the third pixels 3 are arranged in third areas R3. The arrangement of the first pixels 1, the second pixels 2, and the third pixels 3, or in other words, the arrangement of the first area R1, the second areas R2, and the third areas R3 is not limited to the example shown in FIG. 2.

Figure 3A:
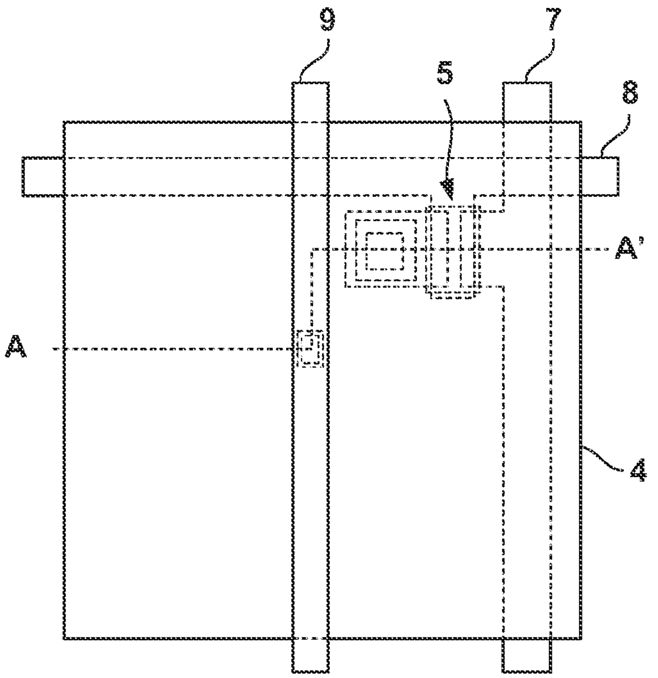
FIGS. 3A and 3B are diagrams showing an example of a configuration of a first pixel according to the first embodiment of the present invention.
Figure 3B:
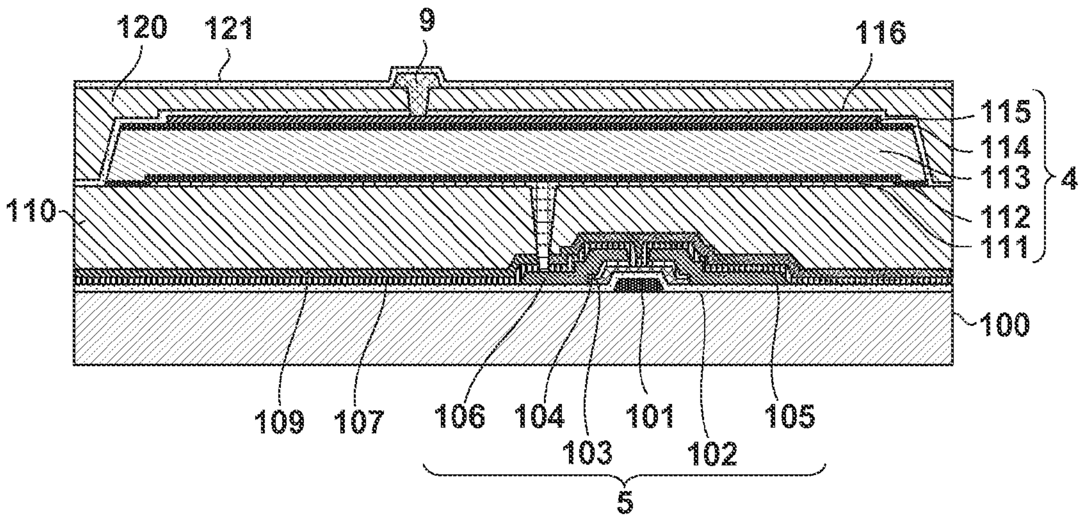

FIGS. 3A and 3B illustrate a configuration of the first pixel 1 according to the first embodiment of the present invention. Here, FIG. 3A is a plan view of the first pixel 1 and FIG. 3B is a cross-sectional view taken along A-A' in FIG. 3A. Note that the plan view is equivalent to an orthographic projection on a surface parallel to the imaging area IR of the radiation imaging apparatus 200. The first pixel 1 can include the conversion element 4 that converts radiation into an electric signal in order to obtain a radiation image, and the switch (TFT) 5 that outputs an electric signal corresponding to the charge of the conversion element 4 to the column signal line 7. The conversion element 4 can include a scintillator that is shared by multiple pixels, although this is not shown in FIG. 3B.

The switch 5 is arranged on an insulating substrate 100 such as a glass substrate. A first interlayer insulating layer 110 is arranged on the switch 5, and the conversion element 4 is arranged on the first interlayer insulating layer 110. The switch 5 includes a control electrode 101, a first insulating layer 102, a first semiconductor layer 103, a first impurity semiconductor layer 104 with an impurity concentration higher than that of the first semiconductor layer 103, a first main electrode 105, and a second main electrode 106, which are above the substrate 100 in the stated order starting from the substrate 100 side. The first impurity semiconductor layer 104 has areas in contact with the first main electrode 105 and the second main electrode 106, and the area located between those areas in the first semiconductor layer 103 is a channel area of the switch 5. The control electrode 101 is connected to the gate line 8, the first main electrode 105 is connected to the column signal line 7, and the second main electrode 106 is connected to the output electrode (individual electrode) 111 of the conversion element 4.

In the first embodiment, the first main electrode 105, the second main electrode 106, and the column signal line 7 are constituted by the same conducting layer, and the first main electrode 105 forms a portion of the column signal line 7. A second insulating layer 107, a third insulating layer 109, and the first interlayer insulating layer 110 are arranged in the stated order above the first main electrode 105, the second main electrode 106, and the column signal line 7, starting from the side of the column signal line 7. A third insulating layer 109 is provided so as to cover the switch 5, the control electrode 101, and the column signal line 7.

In the example shown in FIG. 3B, the switch 5 is constituted by an inverted-staggered TFT using semiconductor layers and impurity semiconductor layers whose chief material is amorphous silicon, although this is merely an example. The switch 5 can be constituted by a staggered TFT whose chief material is polycrystalline silicon, an organic TFT, or an oxide TFT. The first interlayer insulating layer 110 is arranged between the substrate 100 and the output electrode (individual electrode) 111 so as to cover the switch 5, and has a contact hole.

The output electrode 111 of the conversion element 4 and the second main electrode 106 are connected via a contact plug embedded in the contact hole formed in the first interlayer insulating layer 110. The conversion element 4 includes the output electrode (individual electrode) 111, a second impurity semiconductor layer 112, a second semiconductor layer 113, a third impurity semiconductor layer 114, and a common electrode 115, which are above the first interlayer insulating layer 110 in the stated order starting from the side of the first interlayer insulating layer 110. A fourth insulating layer 116 is arranged on the common electrode 115 of the conversion element 4. The bias line 9, which is arranged on the second interlayer insulating layer 120, is connected to the common electrode 115 of the conversion element 4. A fifth insulating layer 121 serving as a protective film is arranged on the bias line 9.

Figure 4A:
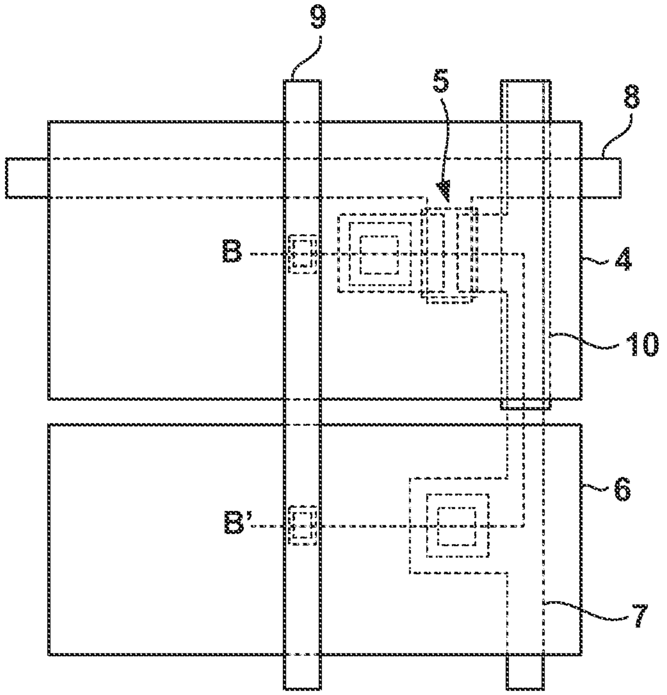
FIGS. 4A and 4B are diagrams showing an example of a configuration of a second pixel according to the first embodiment of the present invention.
Figure 4B:
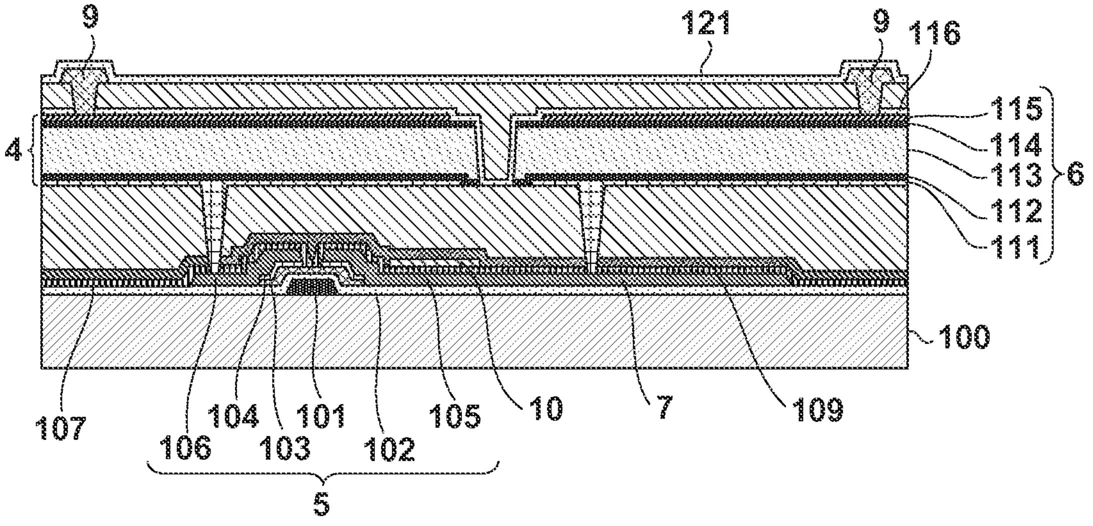

FIGS. 4A and 4B illustrate a configuration of the second pixel 2 according to the first embodiment of the present invention. Here, FIG. 4A is a plan view of the second pixel 2 and FIG. 4B is a cross-sectional view taken along B-B' in FIG. 4A. The second pixel 2 can include the conversion element 4 that converts radiation into an electric signal in order to obtain a radiation image, the switch (TFT) 5 that outputs an electric signal corresponding to the charge of the conversion element 4 to the column signal line 7, the sensor 6 for monitoring radiation, and the shield 10. The conversion element 4 and the sensor 6 can include a scintillator that is shared by multiple pixels, although this is not shown in FIG. 3B. The sensor 6 is arranged on the first interlayer insulating layer 110 and has a structure similar to that of the conversion element 4 of the first pixel 1. The common electrode 115 of the conversion element 4 for obtaining a radiation image and the sensor 6 for monitoring radiation is connected to the bias line 9 arranged on the second interlayer insulating layer 120. The output electrode (individual electrode) 111 of the sensor 6 for monitoring is connected to the column signal line 7 via a contact plug embedded in a contact hole formed in the first interlayer insulating layer 110.

The second insulating layer 107, the shield 10, the third insulating layer 109, and the first interlayer insulating layer 110 are arranged above the column signal line 7 in the stated order starting from the side of the column signal line 7. By arranging the shield 10 above the column signal line 7, capacitive coupling between the output electrode (individual electrode) 111 of the conversion element 4 and the column signal line 7 can be reduced. Here, the shield 10 includes a portion that is arranged between the output electrode 111 of the conversion element 4 for obtaining a radiation image and the column signal line 7 for reading out a signal from the sensor 6.

Figure 5A:
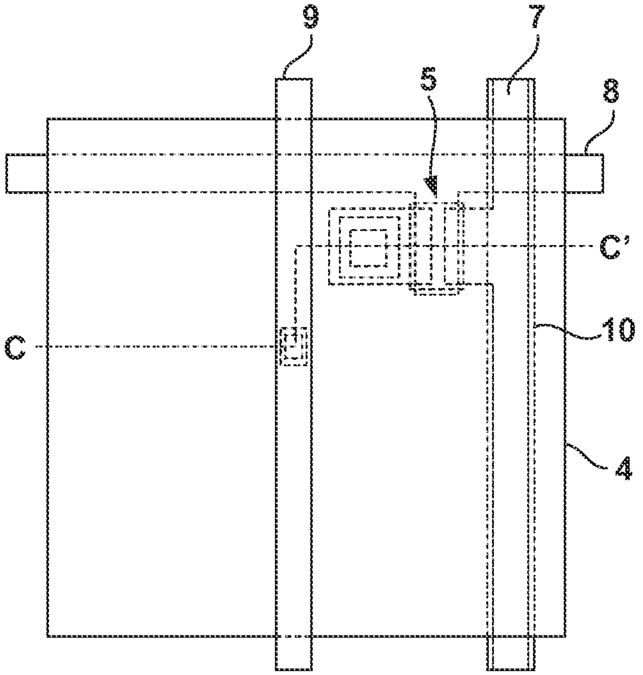
FIGS. 5A and 5B are diagrams showing an example of a configuration of a third pixel according to the first embodiment of the present invention.
Figure 5B:
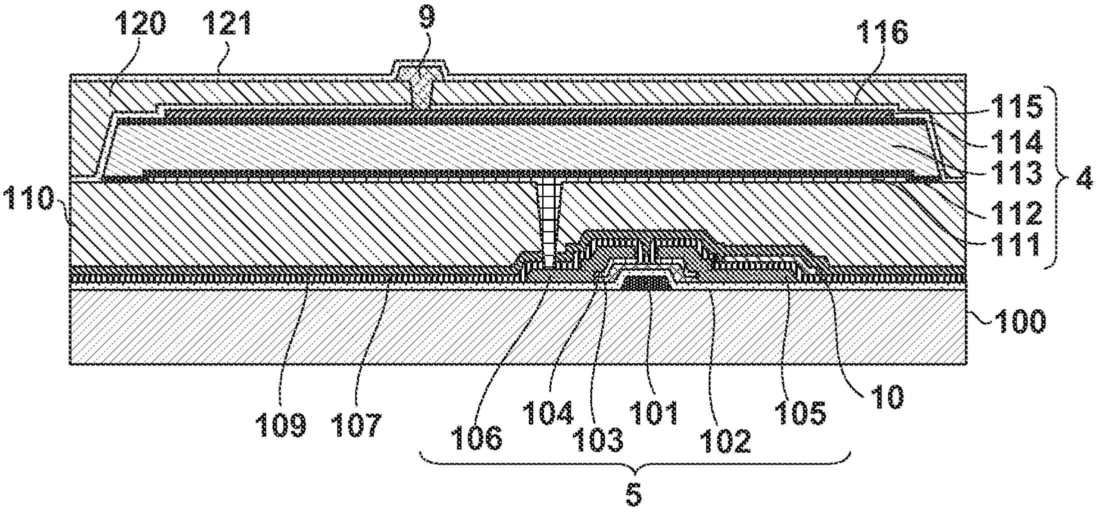

FIGS. 5A and 5B illustrate a configuration of the third pixel 3 according to the first embodiment of the present invention. Here, FIG. 5A is a plan view of the third pixel 3 and FIG. 5B is a cross-sectional view taken along C-C' in FIG. 5A. The third pixel 3 can include the conversion element 4 that converts radiation into an electric signal in order to obtain a radiation image, the switch (TFT) 5 that outputs an electric signal corresponding to the charge of the conversion element 4 to the column signal line 7, and the shield 10. By arranging the shield 10 above the second main electrode 105 that forms part of the column signal line 7, capacitive coupling between the output electrode (individual electrode) 111 of the conversion element 4 and the column signal line 7 can be reduced. Here, the shield 10 includes a portion that is arranged between the output electrode (individual electrode) 111 of the conversion element 4 for obtaining a radiation image and the column signal line 7 for reading out a signal from the sensor 6.

In the first embodiment, the surface area of the conversion element 4 of the second pixel 2 is smaller than the surface area of the conversion element 4 of the first pixel 1 and the third pixel 3, and therefore the value of the signal read out from the second pixel 2 can be smaller than the value of the signal read out from the first pixel 1 and the third pixel 3. However, this kind of problem can be easily resolved by adjusting the gain for amplifying the signal or using image processing.

Next, operations of the radiation imaging apparatus 200 according to the first embodiment will be described. First, the multiple gate lines 8 are activated in sequence while a reset potential is applied to the column signal lines 7. According to this, the potentials of the output electrodes 111 of the conversion elements 4 of the first pixels 1, the second pixels 2, and the third pixels 3 are reset. Also, the output electrodes 111 of the sensors 6 are connected to the column signal lines 7, and therefore the potentials of the output electrodes 111 of the sensors 6 are reset due to the reset potential being applied to the column signal lines 7.

A constant bias potential is applied from the bias power source 53 to the common electrodes 115 of the conversion elements 4 and the sensors 6 via the bias line 9. When radiation is incident on the sensor 6 in such a state, it is converted into visible light by a scintillator (not shown), the visible light is converted into a charge by the second semiconductor layer 113, and an electric signal corresponding to the charge is output to the processing unit 60 (signal processing unit 61) via the column signal line 7. In other words, a signal corresponding to the emission of radiation is read out by the processing unit 60 (signal processing unit 61) from the sensor 6 for monitoring radiation. Accordingly, the emission of radiation can be monitored in real time.

Here, the potential of the output electrodes (individual electrodes) 111 of the conversion elements 4 of the first pixels 1, the second pixels 2, and the third pixels 3 for obtaining a radiation image continues to change while radiation is being emitted. If no shield 10 is provided, crosstalk noise caused by capacitive coupling between the output electrode 111 of the conversion element 4 and the column signal line 7 will be superimposed on the signal output from the sensor 6 to the processing unit 60 (signal processing unit 61) via the column signal line 7. On the other hand, as in the first embodiment, by providing the shield 10, capacitive coupling between the output electrode 111 of the conversion element 4 and the column signal line 7 is reduced and crosstalk is also reduced.

When emission of radiation is detected based on the output from the sensor 6, signals are read out after the elapse of a predetermined amount of time by the processing unit 60 (signal processing unit 61) from the pixels (conversion elements 4) for obtaining a radiation image. Also, after the emission of radiation is detected based on the output from the sensor 6, when the integrated value of the output of the sensor 6 reaches a defined amount, a signal for stopping the emission of radiation may be sent to the radiation source.

Hereinafter, the radiation imaging apparatus 200 according to a second embodiment of the present invention will be described. Note that items not mentioned in the second embodiment may be as described in the first embodiment.

Figure 6:
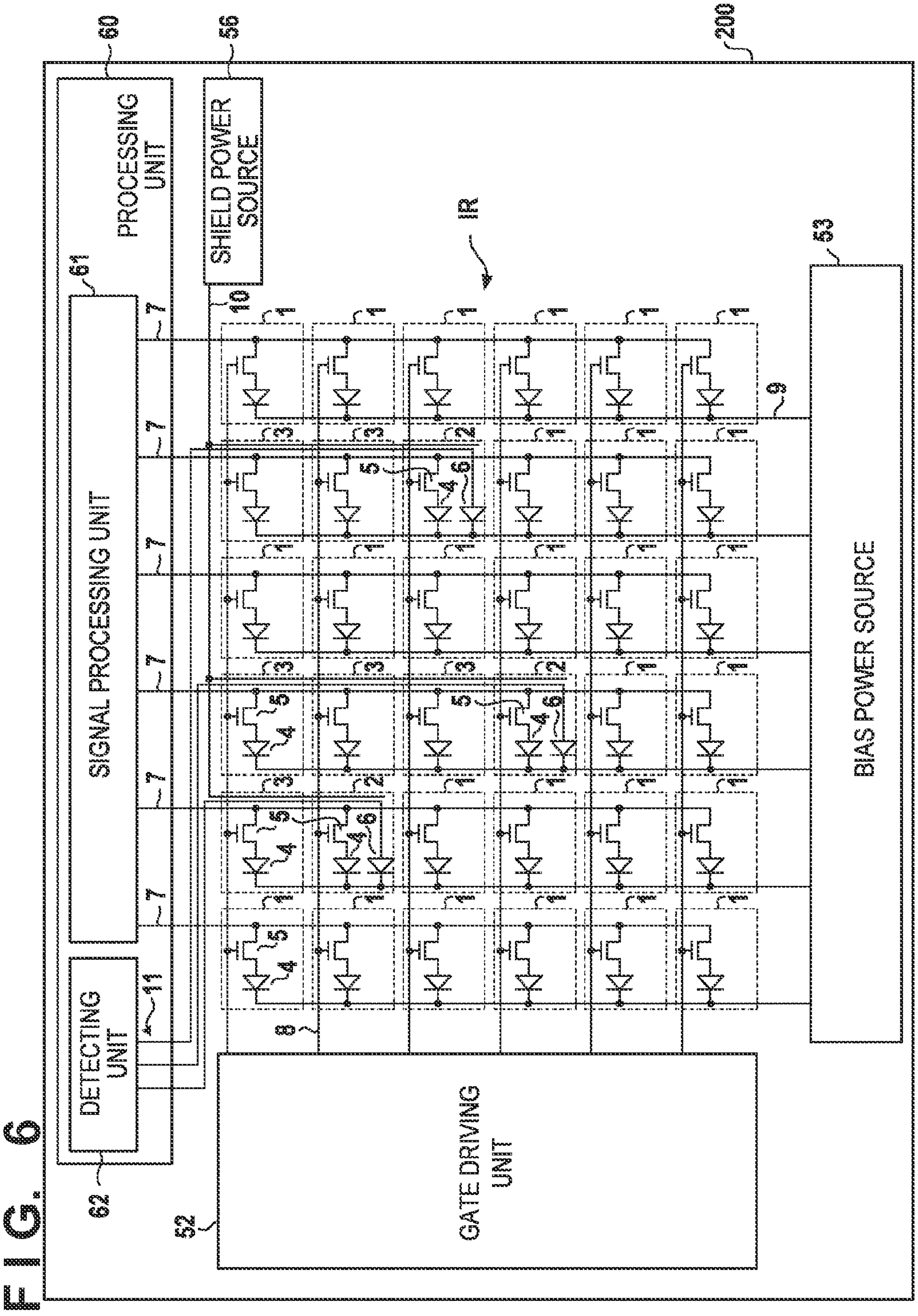
FIG. 6 is a diagram showing a configuration of the radiation imaging apparatus according to a second embodiment of the present invention.

FIG. 6 shows a configuration of the radiation imaging apparatus 200 according to the second embodiment of the present invention. In the first embodiment, the output electrodes 111 of the sensors 6 are connected to the signal processing unit 61 via the column signal lines 7, but in the second embodiment, the output electrodes 111 of the sensors 6 are connected to a detecting unit 62 via dedicated detection signal lines (signal lines) 11. Here, one or more sensors 6 are connected to one detection signal line 11, and the radiation imaging apparatus 200 can have one or more detection signal lines 11. The detecting unit 62 has a function of monitoring radiation by reading out a signal from the sensor 6 via the detection signal line 11.

Figure 7A:
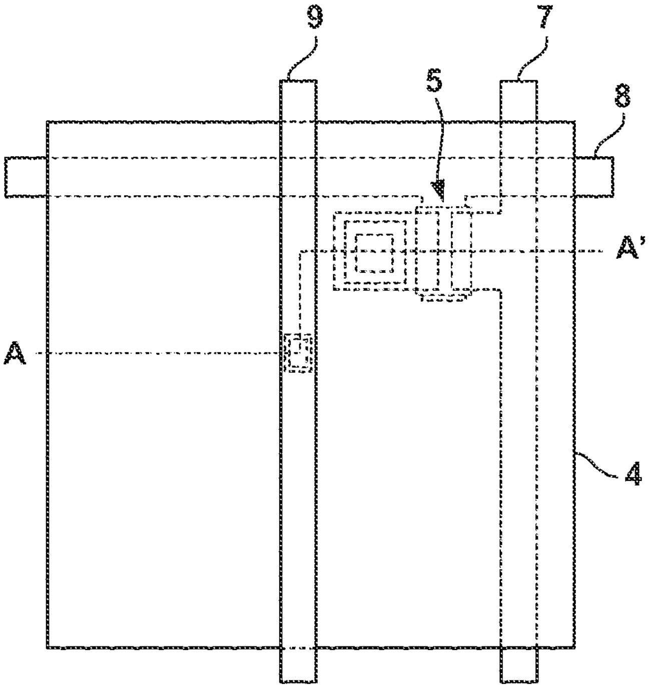
FIGS. 7A and 7B are diagrams showing an example of a configuration of the first pixel according to the second embodiment of the present invention.
Figure 7B:
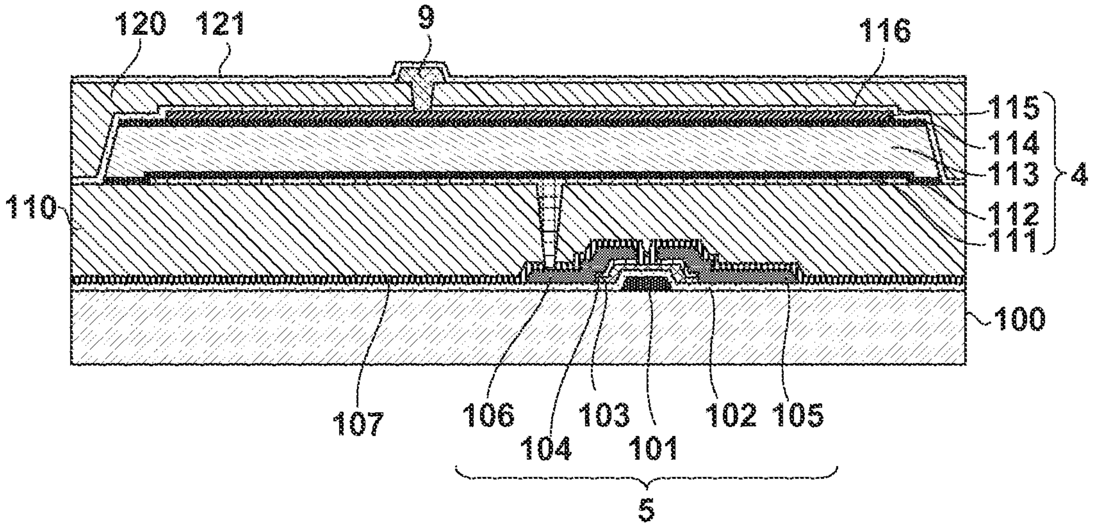

FIGS. 7A and 7B illustrate a configuration of the first pixel 1 according to the second embodiment of the present invention. Here, FIG. 7A is a plan view of the first pixel 1 and FIG. 7B is a cross-sectional view taken along A-A' in FIG. 7A. The first pixel 1 according to the first embodiment has a second insulating layer 109 that is arranged so as to cover the shield 10, but the first pixel 1 according to the second embodiment does not have the second insulating layer 109. The first pixel 1 according to the second embodiment is similar in all other aspects to the first pixel 1 according to the first embodiment.

Figure 8A:
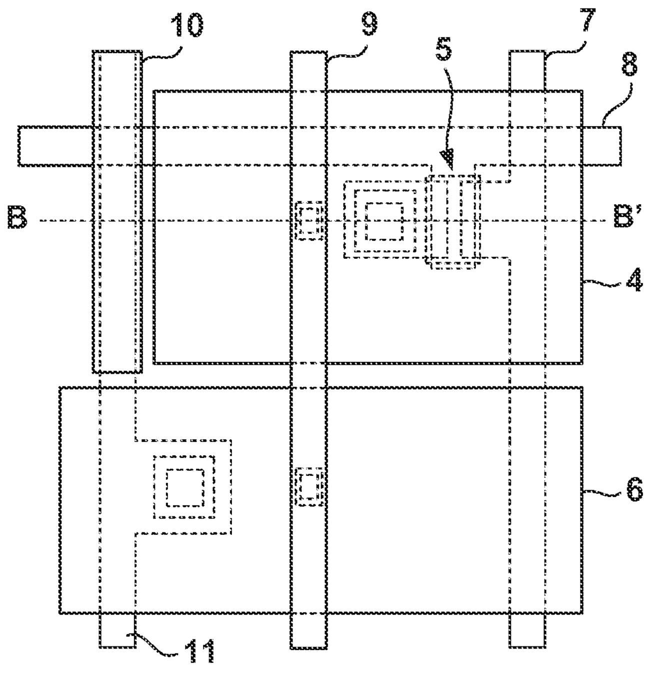
FIGS. 8A and 8B are diagrams showing an example of a configuration of the second pixel according to the second embodiment of the present invention.
Figure 8B:
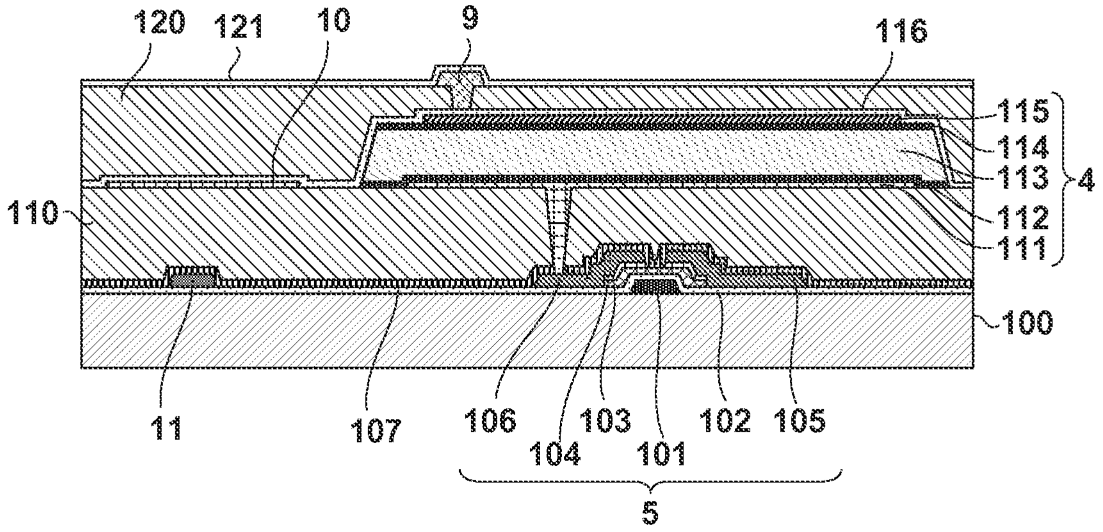

FIGS. 8A and 8B illustrate a configuration of the second pixel 2 according to the second embodiment of the present invention. Here, FIG. 8A is a plan view of the second pixel 2 and FIG. 8B is a cross-sectional view taken along B-B' in FIG. 8A. The second pixel 2 can include the conversion element 4 that converts radiation into an electric signal in order to obtain a radiation image, the switch 5 that outputs an electric signal corresponding to the charge of the conversion element 4 to the column signal line 7, the sensor 6 for monitoring radiation, and the shield 10.

The conversion element 4 and the sensor 6 can include a scintillator that is shared by multiple pixels. The sensor 6 is arranged on the first interlayer insulating layer 110 and has a structure similar to that of the conversion element 4 of the first pixel 1. The common electrode 115 of the conversion element 4 for obtaining a radiation image and the sensor 6 for monitoring radiation is connected to the bias line 9 arranged on the second interlayer insulating layer 120. The output electrode (individual electrode) 111 of the sensor 6 for monitoring is connected to the detection signal line 11 via a contact plug embedded in a contact hole formed in the first interlayer insulating layer 110.

With the second pixel 2 of the second embodiment, the detection signal line 11 does not overlap with the output electrodes 111 of the multiple conversion elements 4 in plan view (in an orthogonal projection on a surface parallel to the imaging area IR). Also, with the second pixel 2 of the second embodiment, the shield 10 includes a portion arranged on the same layer as the output electrodes 111 of the multiple conversion elements 4.

Here, capacitive coupling increases as the potential gradient between the electrodes increases, but in a configuration in which the electrodes do not overlap in plan view, the potential gradient decreases, and therefore capacitive coupling decreases. Accordingly, with a configuration in which the detection signal line 11 and the output electrodes 111 of the conversion elements 4 do not overlap in plan view, it is possible to reduce capacitive coupling between the detection signal line 11 and the output electrodes 111 of the conversion elements 4 and to reduce crosstalk. Also, by arranging the first interlayer insulating layer 110 between the shield 10 and the detection signal line 11, the parasitic capacitance of the detection signal line 11 can be reduced.

In the second embodiment, the shield 10 does not have a portion arranged between the detection signal line 11 and the output electrodes 111 of the conversion elements 4. However, since the distance between the detection signal line 11 and the shield 10 is smaller than the distance between the detection signal line 11 and the output electrode 111 of the conversion element 4, capacitive coupling between the detection signal line 11 and the output electrodes 111 of the conversion element 4 can be reduced by the shield 10.

Figure 9A:
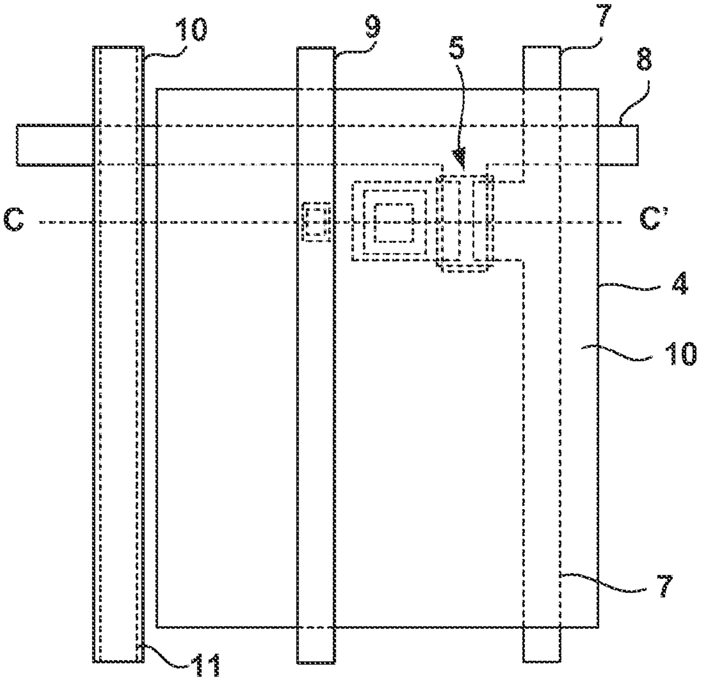
FIGS. 9A and 9B are diagrams showing an example of a configuration of the third pixel according to the second embodiment of the present invention.
Figure 9B:
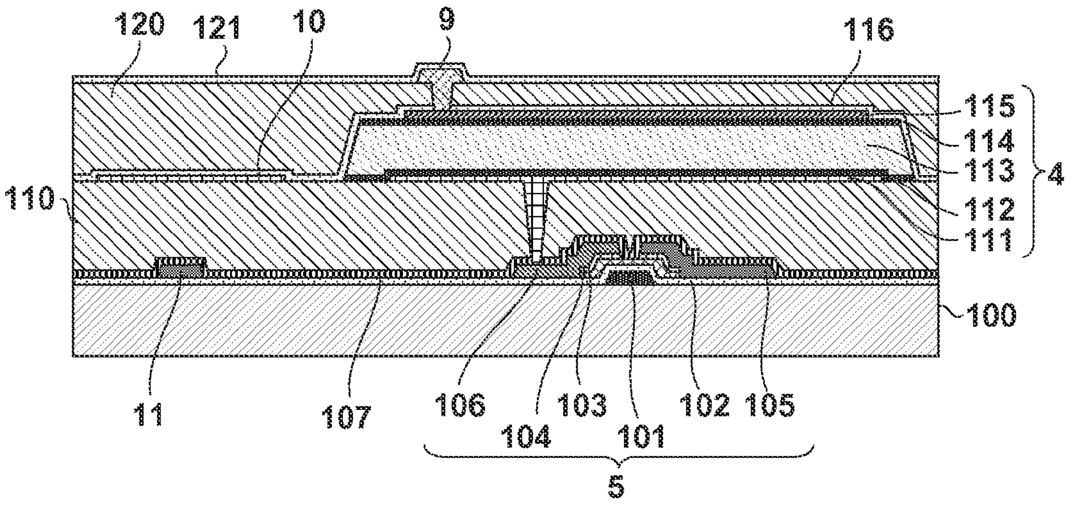

FIGS. 9A and 9B illustrate a configuration of the third pixel 3 according to the second embodiment of the present invention. Here, FIG. 9A is a plan view of the third pixel 3 and FIG. 9B is a cross-sectional view taken along C-C' in FIG. 9A. With the third pixel 3 of the third embodiment, the detection signal line 11 does not overlap with the output electrodes 111 of the multiple conversion elements 4 in plan view, similarly to the second pixel 2. Also, with the third pixel 3 of the second embodiment, the shield 10 includes a portion arranged on the same layer as the output electrodes 111 of the multiple conversion elements 4. This makes it possible to reduce capacitive coupling between the detection signal line 11 and the output electrode 111 of the conversion element 4 in the third pixel 3, and to reduce crosstalk. Also, by arranging the first interlayer insulating layer 110 between the shield 10 and the detection signal line 11, the parasitic capacitance of the detection signal line 11 can be reduced.

Hereinafter, the radiation imaging apparatus 200 according to a third embodiment of the present invention will be described. Note that items not mentioned in the third embodiment may be as described in the second embodiment. In the third embodiment, the shield 10 includes a portion arranged on the same layer as the bias line 9 for supplying a bias potential to the conversion element 4 and the sensor 6 of the pixel for obtaining a radiation image.

Figure 10A:
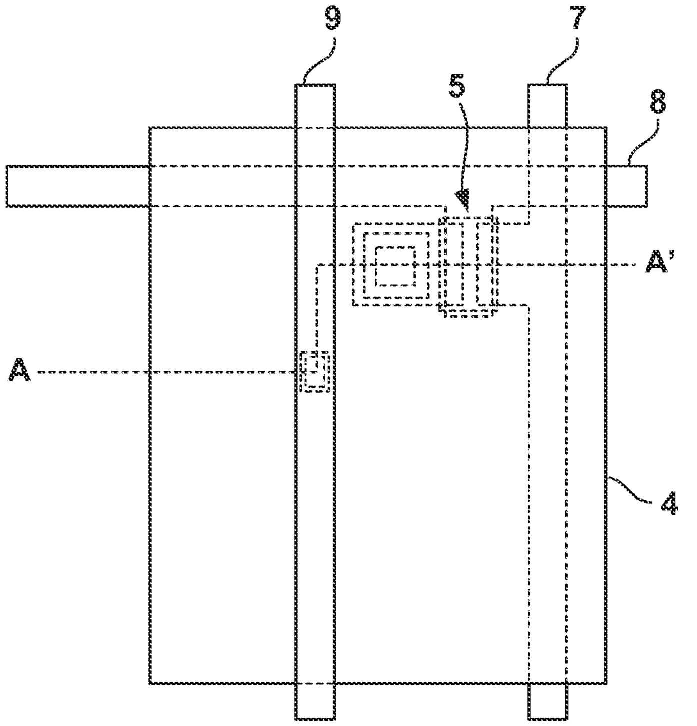
FIGS. 10A and 10B are diagrams showing an example of a configuration of the first pixel according to a third embodiment of the present invention.
Figure 10B:
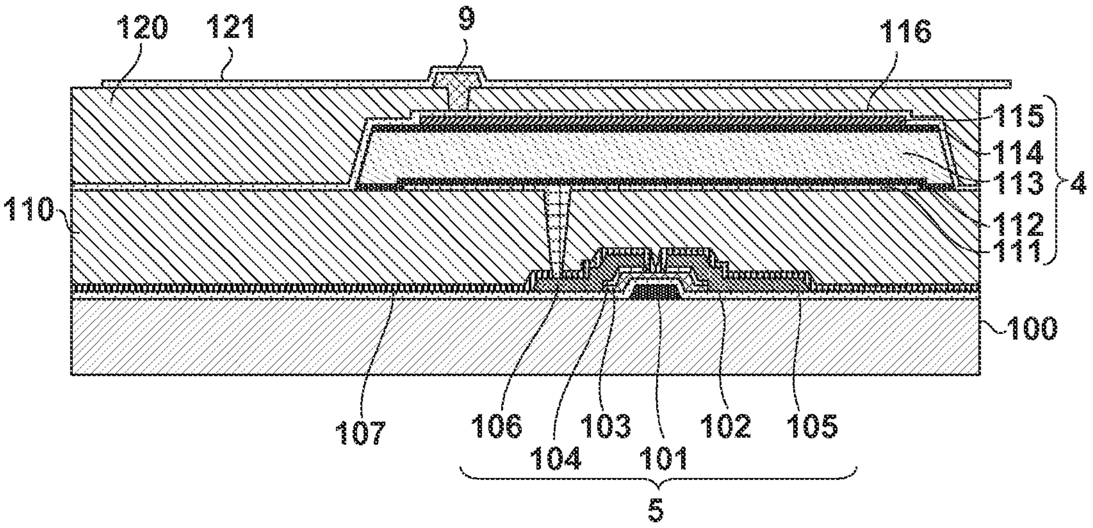

FIGS. 10A and 10B illustrate a configuration of the first pixel 1 according to the third embodiment of the present invention. Here, FIG. 10A is a plan view of the first pixel 1, and FIG. 10B is a cross-sectional view taken along A-A' in FIG. 10A. The first pixel 1 according to the first embodiment has a second insulating layer 109 that is arranged so as to cover the shield 10, but in the third embodiment, the surface area of the conversion element 4 of the first pixel 1 is equal to the surface area of the conversion element 4 of the third pixel 3. Accordingly, it is possible to reduce the difference between the sensitivity of the first pixel 1 and the sensitivity of the third pixel 3.

Figure 11A:
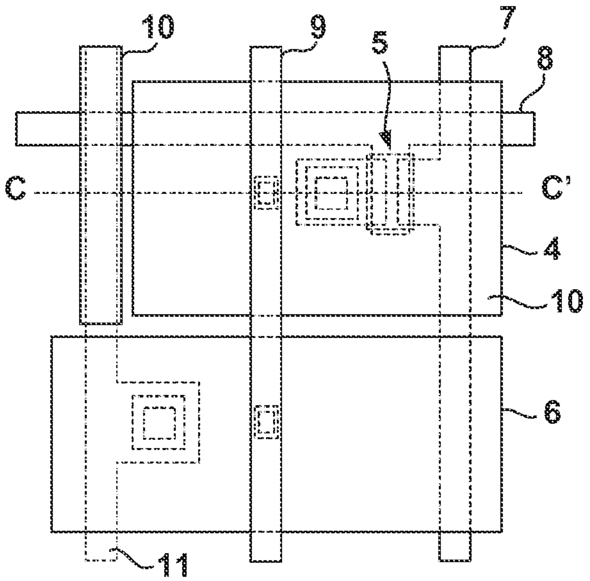
FIGS. 11A to 11C are diagrams showing an example of a configuration of the second pixel according to the third embodiment of the present invention.
Figure 11B:
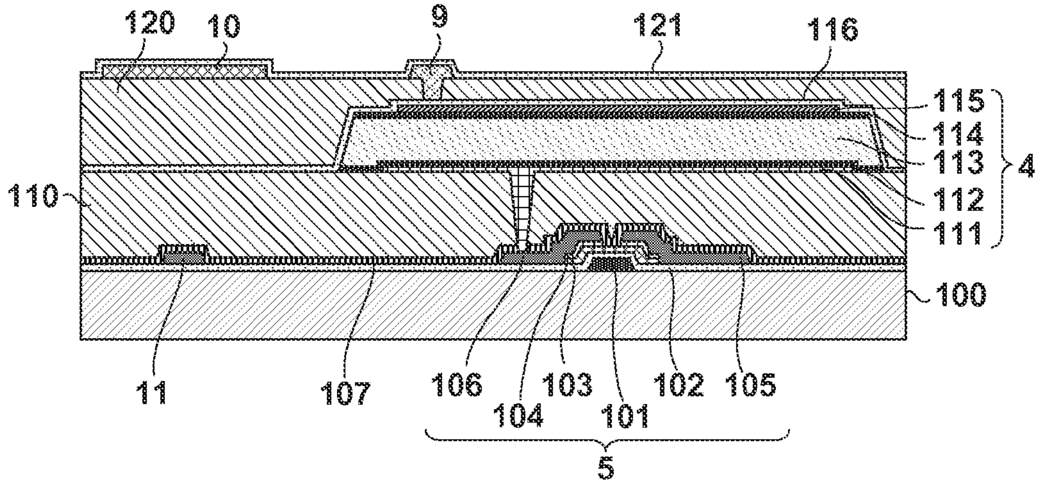
Figure 11C:
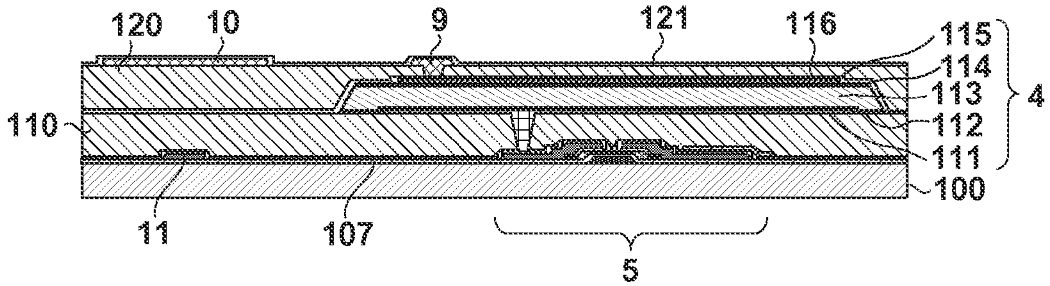

FIGS. 11A to 11C illustrate a configuration of the second pixel 2 according to the third embodiment of the present invention. Here, FIG. 11A is a plan view of the second pixel 2, and FIGS. 11B and 11C are cross-sectional views taken along C-C' in FIG. 11A. FIGS. 11B and 11C show the same structure, but FIG. 11C is closer to the actual aspect ratio than FIG. 11B is. With the second pixel 2 of the third embodiment, the shield 10 includes a portion arranged on the same layer as the bias line 9 for supplying the bias potential to the multiple conversion elements 4 and the sensor 6.

Figure 12A:
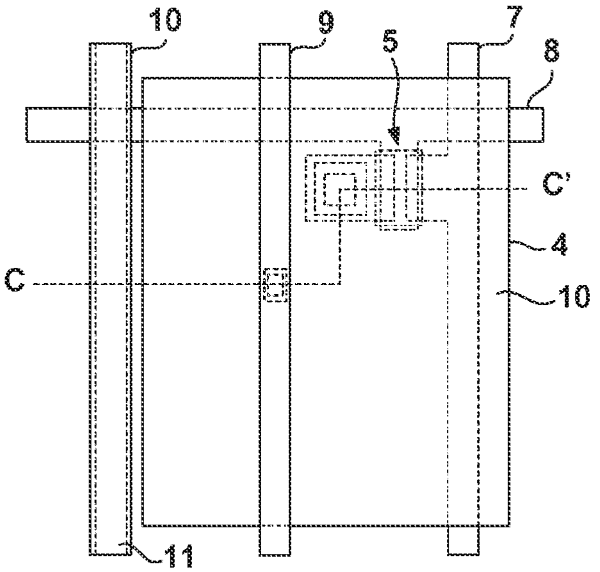
FIGS. 12A to 12C are diagrams showing an example of a configuration of the third pixel according to the third embodiment of the present invention.
Figure 12B:
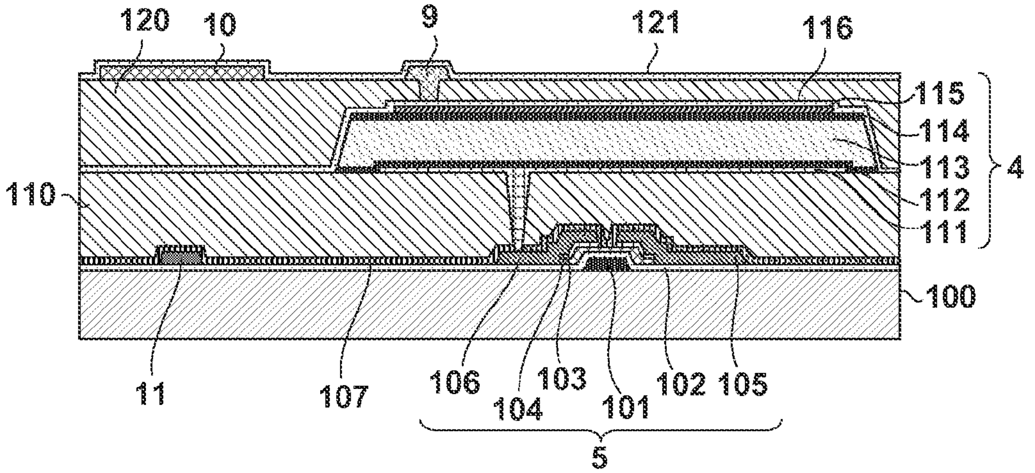
Figure 12C:
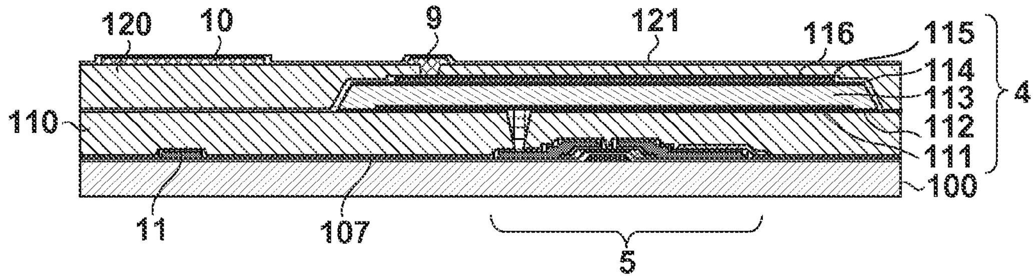

FIGS. 12A to 12C illustrate a configuration of the third pixel 3 according to the third embodiment of the present invention. Here, FIG. 12A is a plan view of the third pixel 3, and FIGS. 12B and 12C are cross-sectional views taken along C-C' in FIG. 12A. FIGS. 12B and 12C show the same structure, but FIG. 12C is closer to the actual aspect ratio than FIG. 12B is. With the third pixel 3 of the third embodiment, the shield 10 includes a portion arranged on the same layer as the bias line 9 for supplying the bias potential to the multiple conversion elements 4 and the sensor 6.

In the third embodiment 3, the distance between the detection signal line 11 and the shield 10 is smaller than the distance between the detection signal line 11 and the output electrode 111 of the conversion element 4, and therefore capacitive coupling between the detection signal line 11 and the output electrode 111 of the conversion element 4 can be reduced by the shield 10.

Figure 13:
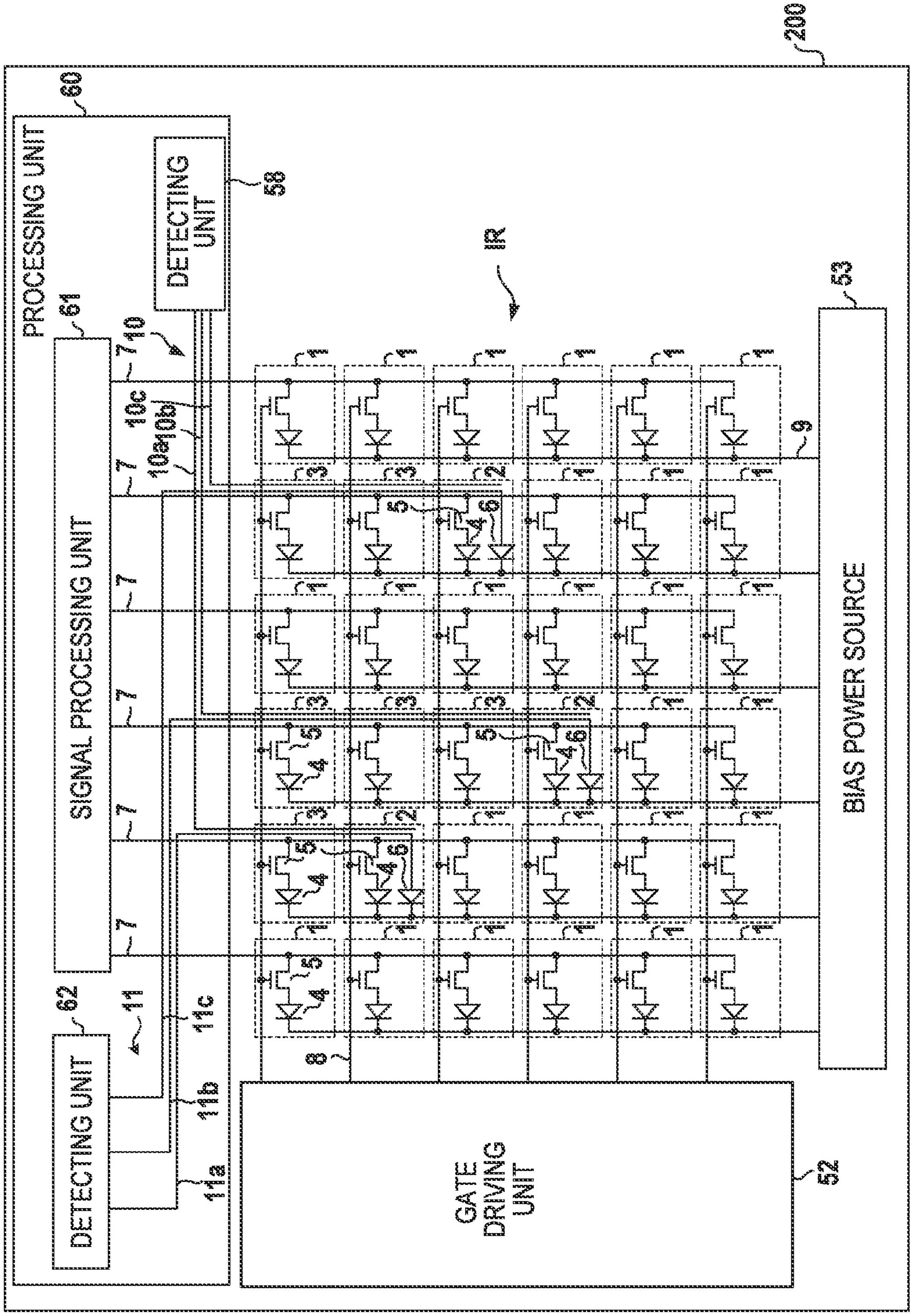
FIG. 13 is a diagram showing a configuration of the radiation imaging apparatus according to a fourth embodiment of the present invention.

Hereinafter, the radiation imaging apparatus 200 according to a fourth embodiment of the present invention will be described. Note that items not mentioned in the fourth embodiment may be as described in the first to third embodiments. FIG. 13 shows a configuration of the radiation imaging apparatus 200 according to the fourth embodiment of the present invention. In the fourth embodiment, the conversion elements 4 of the pixels 1, 2, and 3 for obtaining a radiation image are connected to the signal processing unit 61 via the switches 5 and the column signal lines 7, and the sensors 6 are connected to the detecting unit 62 via the detection signal lines 11.

The radiation imaging apparatus 200 of the fourth embodiment has multiple detection signal lines 11 (11*a*, 11*b*, 11*c*) and multiple shields 10 (10*a*, 10*b*, 10*c*). Here, one shield 10 (10*a*) is provided for one detection signal line 11 (e.g., 11*a*). That is to say, one detection signal line 11 (e.g., 11*a*) and one shield 10 (10*a*) form a pair. A detection signal line 11 and a shield 10 that form a pair are arranged in the same column. The multiple shields 10 are connected to the detecting unit 58. The detecting unit 58 detects electric signals that appear in the shields 10*a*, 10*b*, and 10*c*. The processing unit 60 reduces the influence of crosstalk by correcting the signal detected by the detecting unit 62 based on the signal detected by the detecting unit 58, for example. The first pixel 1, the second pixel 2, and the third pixel 3 in the fourth embodiment have configurations that are respectively similar to those of the first pixel 1, the second pixel 2, and the third pixel 3 according to the second embodiment.

Hereinafter, an example of operations performed by the processing unit 60 according to the fourth embodiment will be described. Crosstalk can occur not only between the output electrodes 111 of the conversion elements 4 for obtaining a radiation image and the detection signal line 11, but also between the output electrodes 111 of the conversion elements 4 and the shields 10. Accordingly, it is possible to obtain a signal indicating the influence of capacitive coupling (crosstalk) based on the electric signal that appears in the shield 10. A specific example thereof will be described below.

Let Cm be the parasitic capacitance between the output electrode 111 of the conversion element 4 of the third pixel 3 and the detection signal line 11, and let Cs be the parasitic capacitance between the output electrode 111 of the conversion element 4 of the third pixel 3 and the shield 10. Let Nm be the number of third pixels 3 crossed by the detection signal line 11, and let Ns be the number of third pixels 3 crossed by the shield 10.

The signal that flows in the detection signal line 11 due to capacitive coupling is proportional to Cm×Nm. On the other hand, the signal that flows in the shield 10 due to capacitive coupling is proportional to Cs×Ns. The detection signal line 11 and the shield 10 pass through third pixels 3 in the same column, and therefore Nm=Ns.

Accordingly, letting the signals that are caused by capacitive coupling and are obtained from the detection signal line 11 and the shield 10 be Sm and Ss respectively, the ratio of Sm to Ss is as described below.

$$Sm:Ss=Cm:Cs$$

Accordingly, when Sm is expressed in terms of Ss, it is expressed as follows:

$$Sm=Ss\times(Cm/Cs)$$

Here, Cm and Cs are known values obtained based on design information. Accordingly, if the signal Ss obtained from the shield 10 is monitored, Sm, which is the component of the crosstalk that is superimposed on the detection signal line 11 during emission of radiation, can be corrected based on Ss. Based on the above-described principles, the processing unit 60 can correct the signal detected by the detecting unit 62 based on the signal detected by the detecting unit 58.

Figure 14:
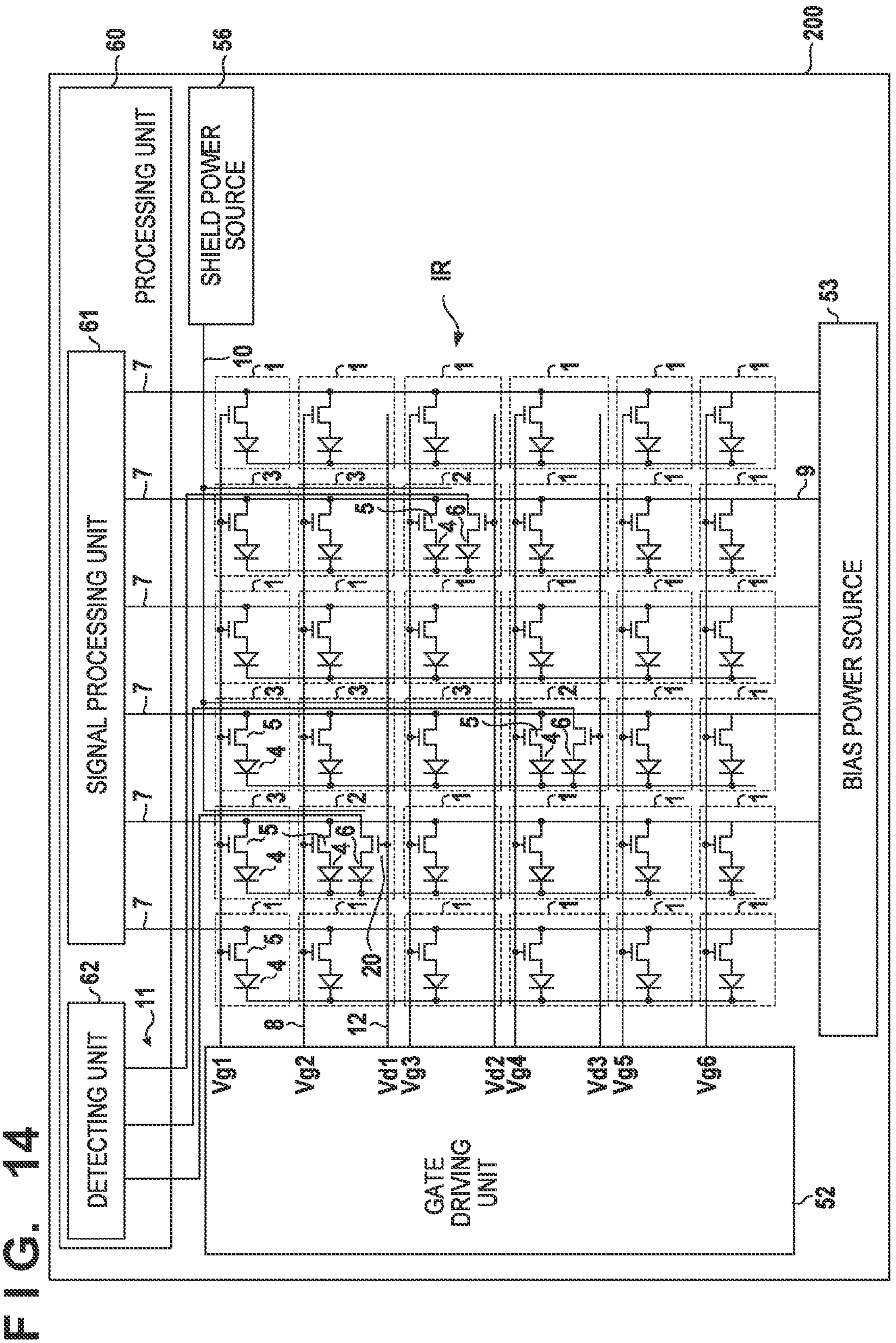
FIG. 14 is a diagram showing a configuration of the radiation imaging apparatus according to a fifth embodiment of the present invention.

Hereinafter, the radiation imaging apparatus 200 according to a fifth embodiment of the present invention will be described. Note that items not mentioned in the fifth embodiment may be as described in the first to fourth embodiments. FIG. 14 shows a configuration of the radiation imaging apparatus 200 according to the fifth embodiment of the present invention. In the first to fourth embodiments, the output electrodes 111 of the sensors 6 are directly connected to the column signal lines 7 or the detection signal lines 11. In the fifth embodiment, the output electrodes 111 of the sensors 6 and the detection signal line 11 are connected via switches (TFTs) 20. Note that as the fifth embodiment, FIG. 14 shows an example in which the second embodiment has been modified, but the first, third, or fourth embodiment may be changed such that the output electrode 111 of the sensor 6 is connected via the switch (TFT) 20 to the column signal line 7 or the detection signal line 11.

Figure 15A:
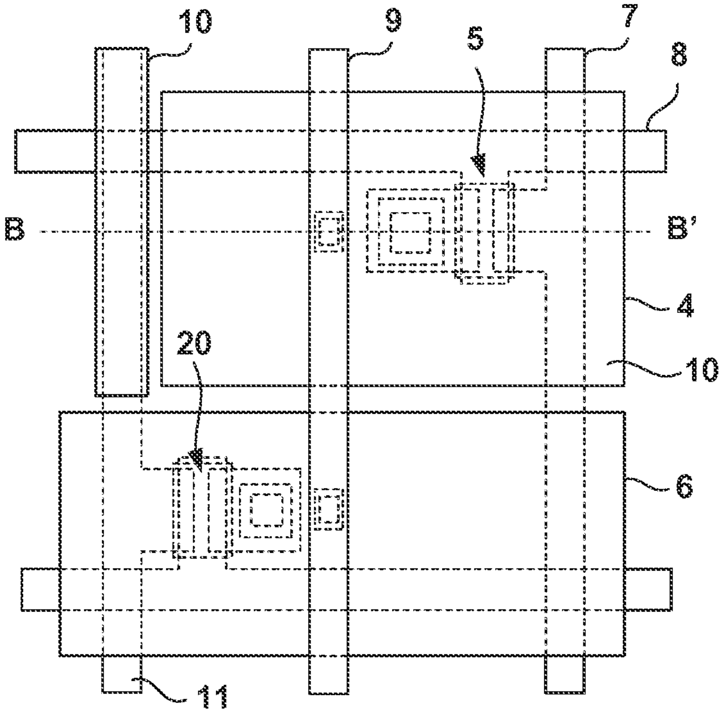
FIGS. 15A and 15B are diagrams showing an example of a configuration of the second pixel according to the fifth embodiment of the present invention.
Figure 15B:
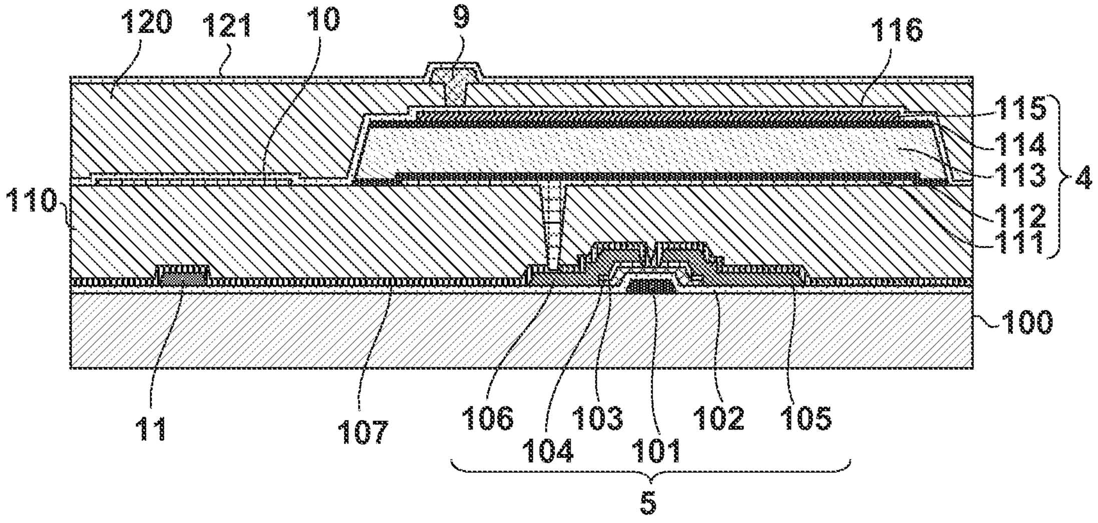

The first pixel 1 and the third pixel 3 each can have a configuration similar to that of the second embodiment. FIGS. 15A and 15B illustrate a configuration of the second pixel 2 according to the fifth embodiment of the present invention. Here, FIG. 15A is a plan view of the second pixel 2, and FIG. 15B is a cross-sectional view taken along B-B' in FIG. 15A. The second pixel 2 can include the conversion element 4 that converts radiation into an electric signal in order to obtain a radiation image, the switch (TFT) 5 that outputs an electric signal corresponding to the charge of the conversion element 4 to the column signal line 7, the sensor 6 for monitoring radiation, and the shield 10. Also, the second pixel 2 can include a switch 20 that outputs an electric signal corresponding to the charge of the sensor 6 to the detection signal line 11. The switch 20 can have the same configuration as the switch 5, although this is not shown in the drawing.

The gate line 8 is connected to the control electrode (gate electrode) of the switch 5 for connecting the conversion element 4 for obtaining a radiation image to the column signal line 7, and Vg (Vg1 to Vg6) is applied to the gate line 8 by the gate driving unit 52. Here, Vg1 to Vg6 are reference numerals for distinguishing the signals applied to the switches 5 in mutually different rows from one another. A gate line 12 is connected to a control electrode (gate electrode) of the switch 20 for connecting the sensor 6 to the detection signal line 11, and Vd (Vd1 to Vd3) is applied by the gate driving line 52 to the gate line 12. Here, Vd1 to Vd3 are reference numerals for distinguishing the signals applied to the switches 20 in mutually different rows from one another.

Figure 16:
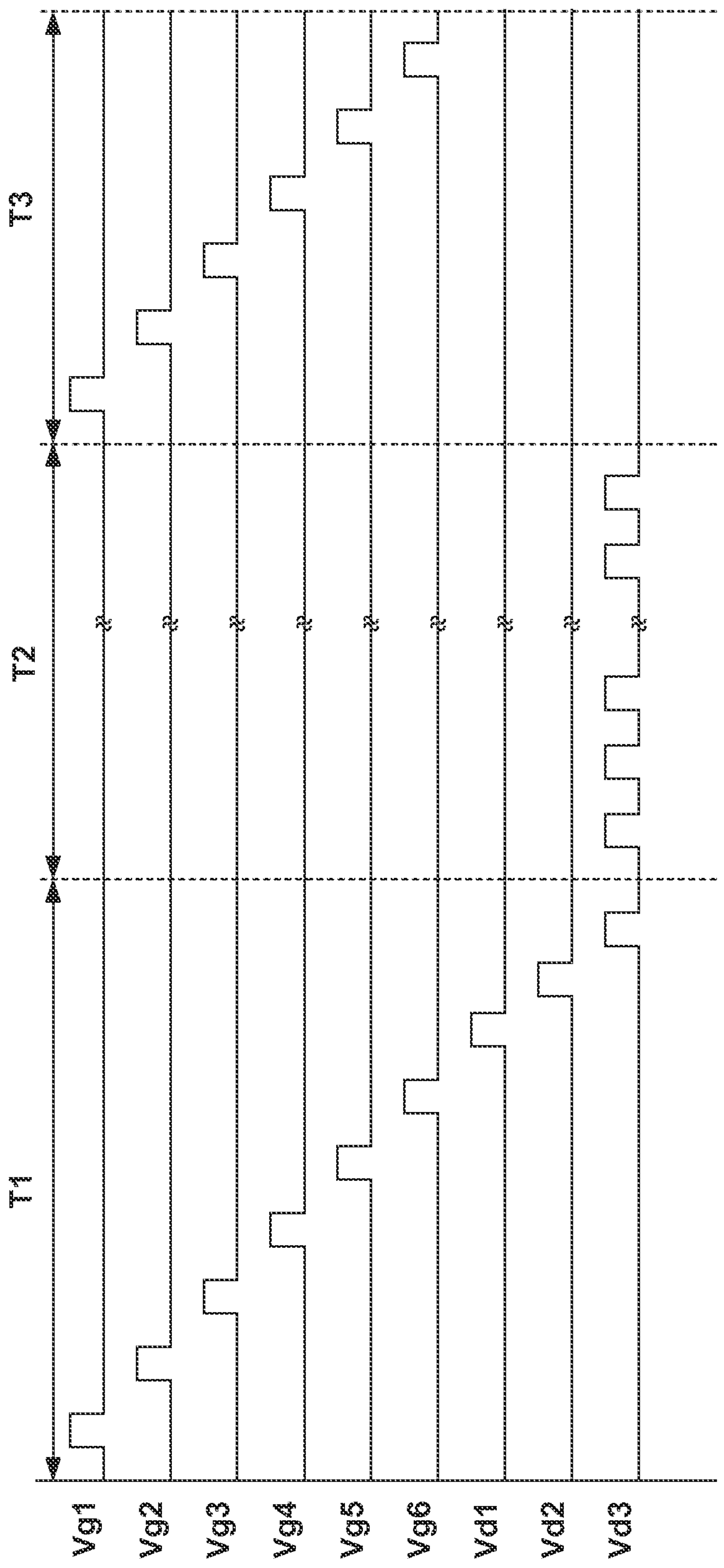
FIG. 16 is a diagram illustrating operations performed by the radiation imaging apparatus according to the fifth embodiment of the present invention.

FIG. 16 shows operations performed by the radiation imaging apparatus 200 according to the fifth embodiment of the present invention. The operation period of the radiation imaging apparatus 200 includes periods T1, T2, and T3. In period T1, Vg1 to Vg6 and Vd1 to Vd3 are activated in sequence. According to this, the output electrodes 111 of the conversion elements 4 of the pixel 1 to the pixel 3 are reset to a potential corresponding to the reset potential of the column signal lines 7, and the output electrodes 111 of the sensors 6 are reset to a potential corresponding to the reset potential of the detection signal lines 11. Period T2 is a period during which radiation is emitted. In period T2, the emission of radiation is monitored. In period T2, the integrated irradiation amount of radiation is measured. In period T2, Vd1 to Vd3 are activated intermittently, and the signals are read out from the sensors 6 of the second pixels 2. In period T3, the emission of radiation ends and signals are read out from the conversion elements 4 for obtaining a radiation image. In period T3, Vd1 to Vd3 are inactivated, and Vg1 to Vg5 are activated in sequence.

Figure 17:
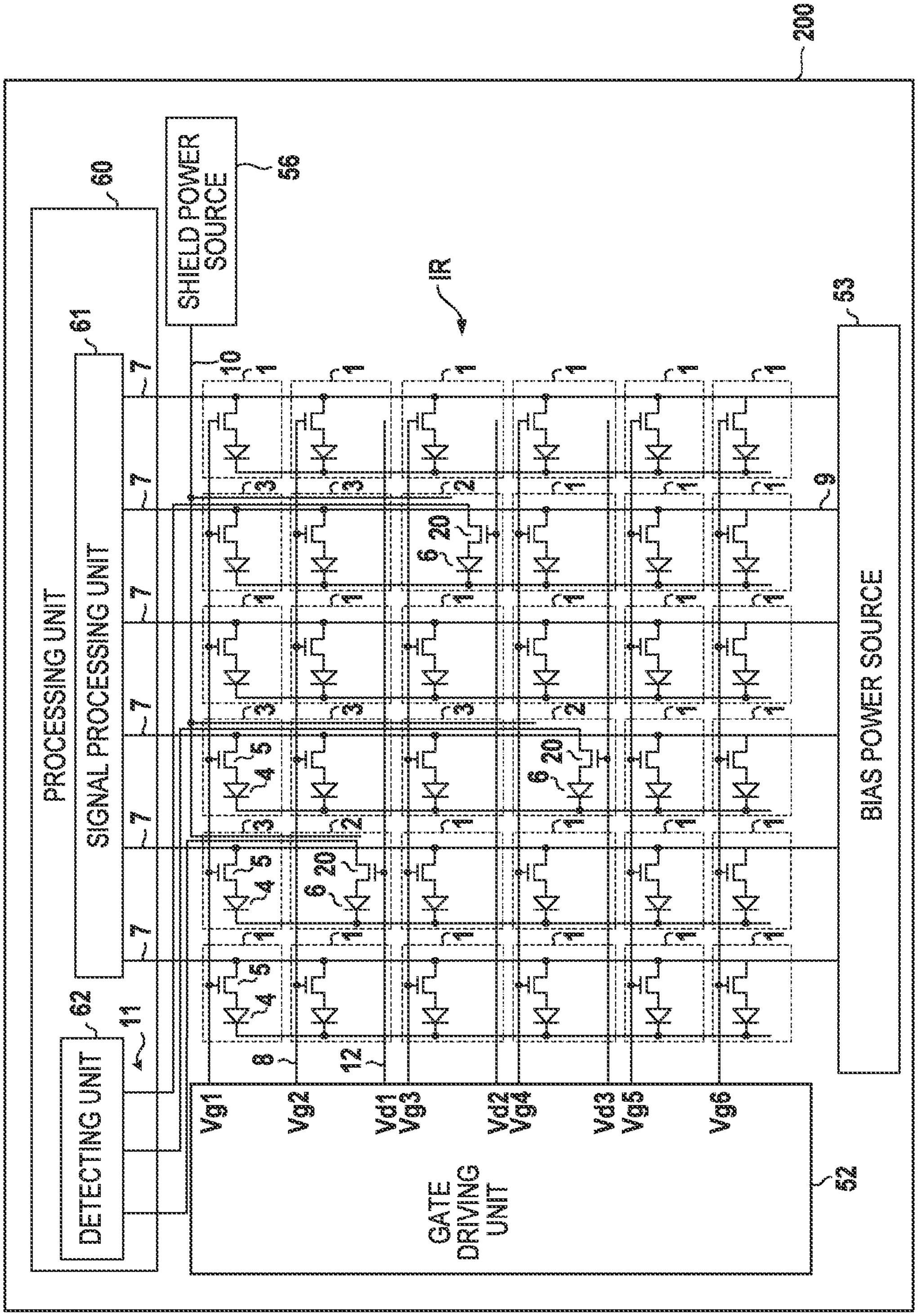
FIG. 17 is a diagram showing a configuration of the radiation imaging apparatus according to a sixth embodiment of the present invention.

Hereinafter, the radiation imaging apparatus 200 according to a sixth embodiment of the present invention will be described. Note that items not mentioned in the sixth embodiment may be as described in the first to fifth embodiments. FIG. 17 shows a configuration of the radiation imaging apparatus 200 according to the sixth embodiment of the present invention. With the radiation imaging apparatus 200 according to the sixth embodiment, the second pixel 2 includes the sensor 6 and the switch 20, but not the conversion element 4 and the switch 5. Here, the sensor 6 is connected to the processing unit 60 (detecting unit 62) via the switch 20 and the detection signal line 11. The third pixel 3 includes the detection signal line 11 and the shield 10.

Figure 18A:
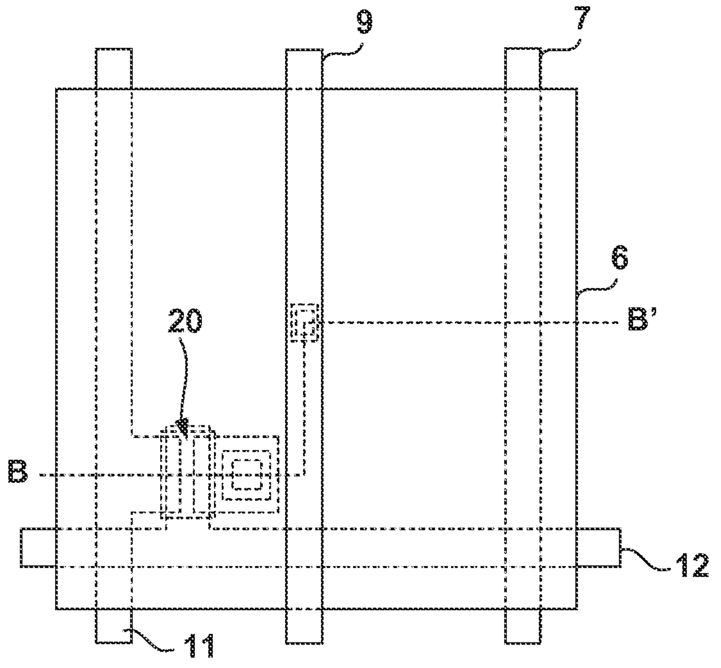
FIGS. 18A and 18B are diagrams showing an example of a configuration of the second pixel according to the sixth embodiment of the present invention.
Figure 18B:
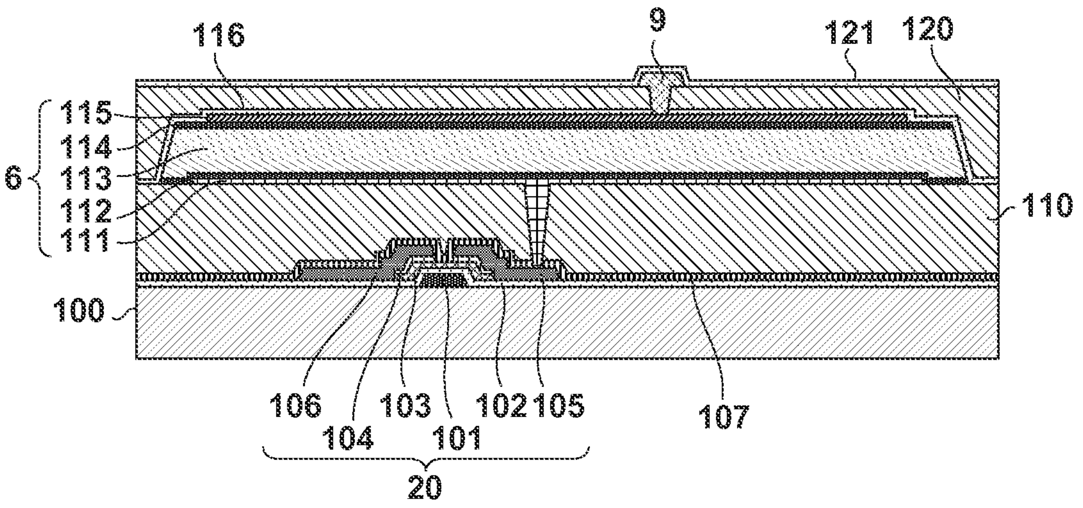

The first pixel 1 and the third pixel 3 each can have a configuration similar to the first pixel 1 of the second embodiment. FIGS. 18A and 18B illustrate a configuration of the second pixel 2 according to the sixth embodiment of the present invention. Here, FIG. 18A is a plan view of the second pixel 2, and FIG. 18B is a cross-sectional view taken along B-B' in FIG. 18A.

The switch 20 includes a control electrode 101, a first insulating layer 102, a first semiconductor layer 103, a first impurity semiconductor layer 104 with an impurity concentration higher than that of the first semiconductor layer 103, a first main electrode 105, and a second electrode 106, which are above the substrate 100 in the stated order starting from the substrate 100 side. The first impurity semiconductor layer 104 has areas in contact with the first main electrode 105 and the second main electrode 106, and the area located between those areas in the first semiconductor layer 103 is a channel area of the switch 20. The control electrode 101 is connected to the gate line 12, the first main electrode 105 is connected to the detection signal line 11, and the second main electrode 106 is connected to the output electrode (individual electrode) 111 of the sensor 6.

Although a signal for forming a radiation image cannot be read out from the second pixel 2, a signal indicating the position of the second pixel 2 can be obtained from the second pixel 2 by performing interpolation processing using the signals of peripheral pixels.

Figure 19A:
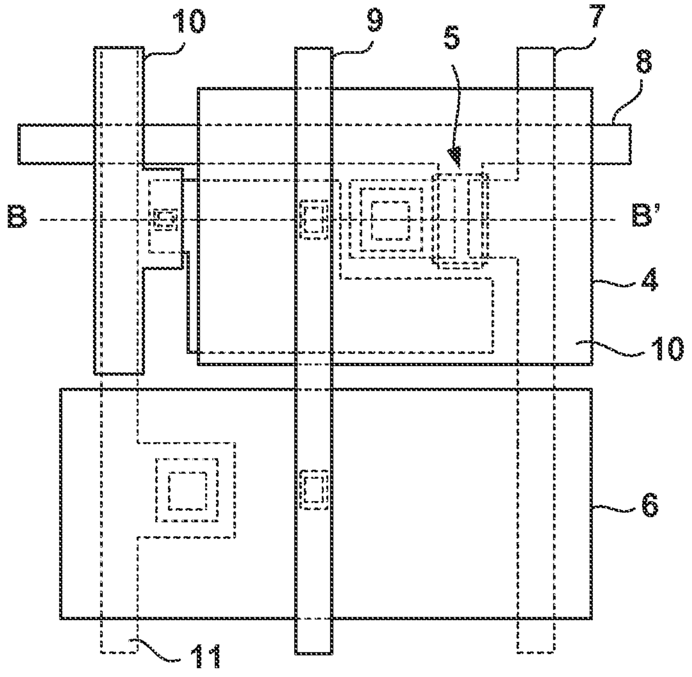
FIGS. 19A and 19B are diagrams showing an example of a configuration of the second pixel according to a seventh embodiment of the present invention.
Figure 19B:
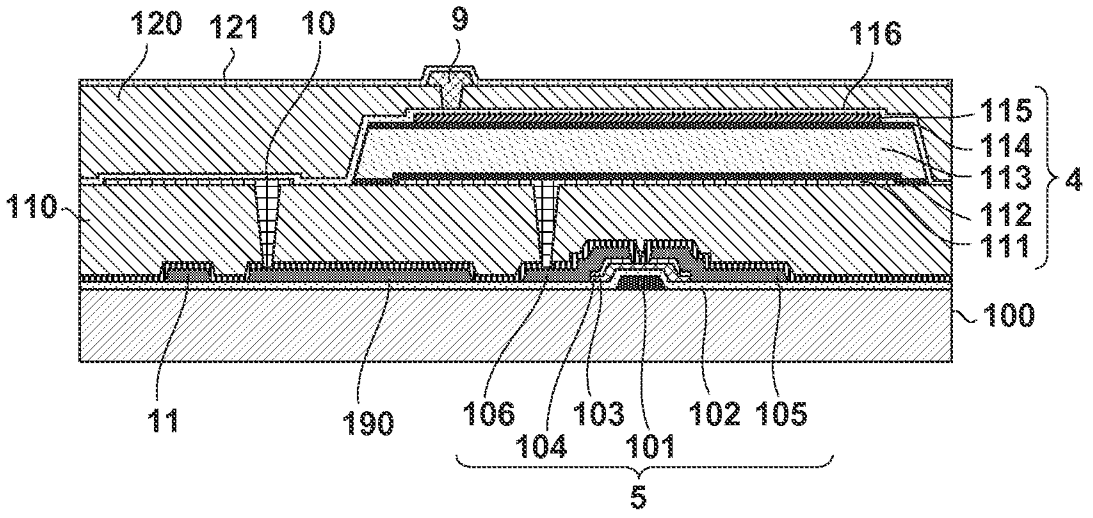
Figure 20A:
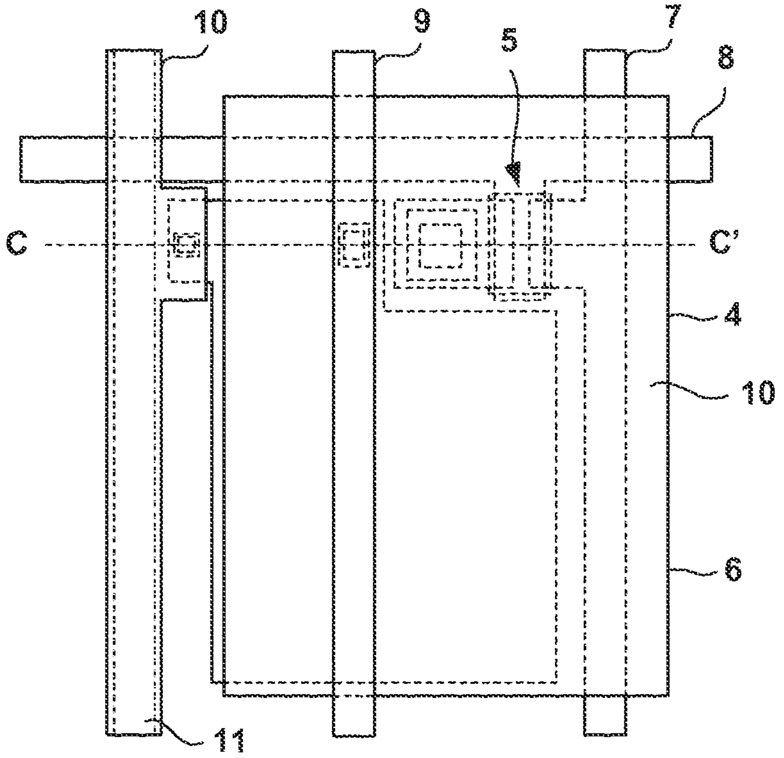
FIGS. 20A and 20B are diagrams showing an example of a configuration of the third pixel according to the seventh embodiment of the present invention.
Figure 20B:
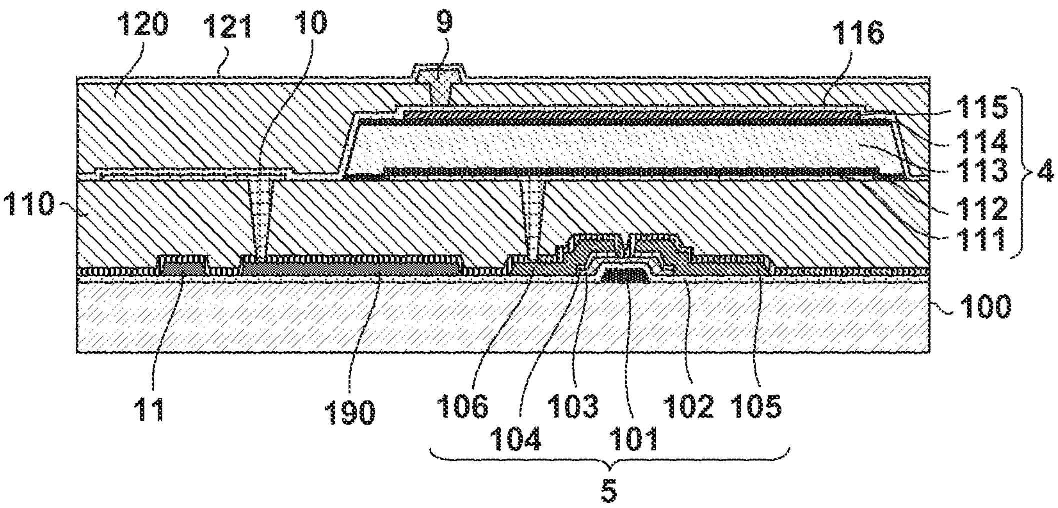

Hereinafter, the radiation imaging apparatus 200 according to a seventh embodiment of the present invention will be described. Note that items not mentioned in the seventh embodiment may be as described in the first to sixth embodiments. The first pixel 1 can have a configuration similar to that of the first pixel 1 of the second embodiment, for example. FIGS. 19A and 19B illustrate a configuration of the second pixel 2 according to the seventh embodiment of the present invention. Here, FIG. 19A is a plan view of the second pixel 2, and FIG. 19B is a cross-sectional view taken along B-B' in FIG. 19A. FIGS. 20A and 20B illustrate a configuration of the third pixel 3 according to the seventh embodiment of the present invention. Here, FIG. 20A is a plan view of the third pixel 3, and FIG. 20B is a cross-sectional view taken along C-C' in FIG. 20A.

When radiation is emitted to the conversion elements 4 for obtaining a radiation image, current flows in the shield 10 due to capacitive coupling between the output electrodes 111 of the conversion elements 4 and the shield 10. In the seventh embodiment, the processing unit 60 detects the start of emission of radiation based on an electric signal that appears in the shield 10, or in other words, based on a current that flows in the shield 10.

With the second pixel 2 and the third pixel 3, the shield 10 is connected to a metal layer 190 on the same layer as the detection signal line 11 via a contact plug filling a contact hole formed in the first interlayer insulating layer 110. In plan view, the metal layer 190 overlaps with the output electrodes 111 of the conversion elements 4 for obtaining a radiation image. With this kind of configuration, the parasitic capacitance between the output electrodes 111 of the conversion elements 4 and the shield 10 increases. According to this, the potential variation of the shield 10 when radiation is incident on the conversion element 4 increases. Accordingly, the electric signal that appears in the shield 10 increases, and the start of emission of radiation can be accurately detected.

Figure 21:
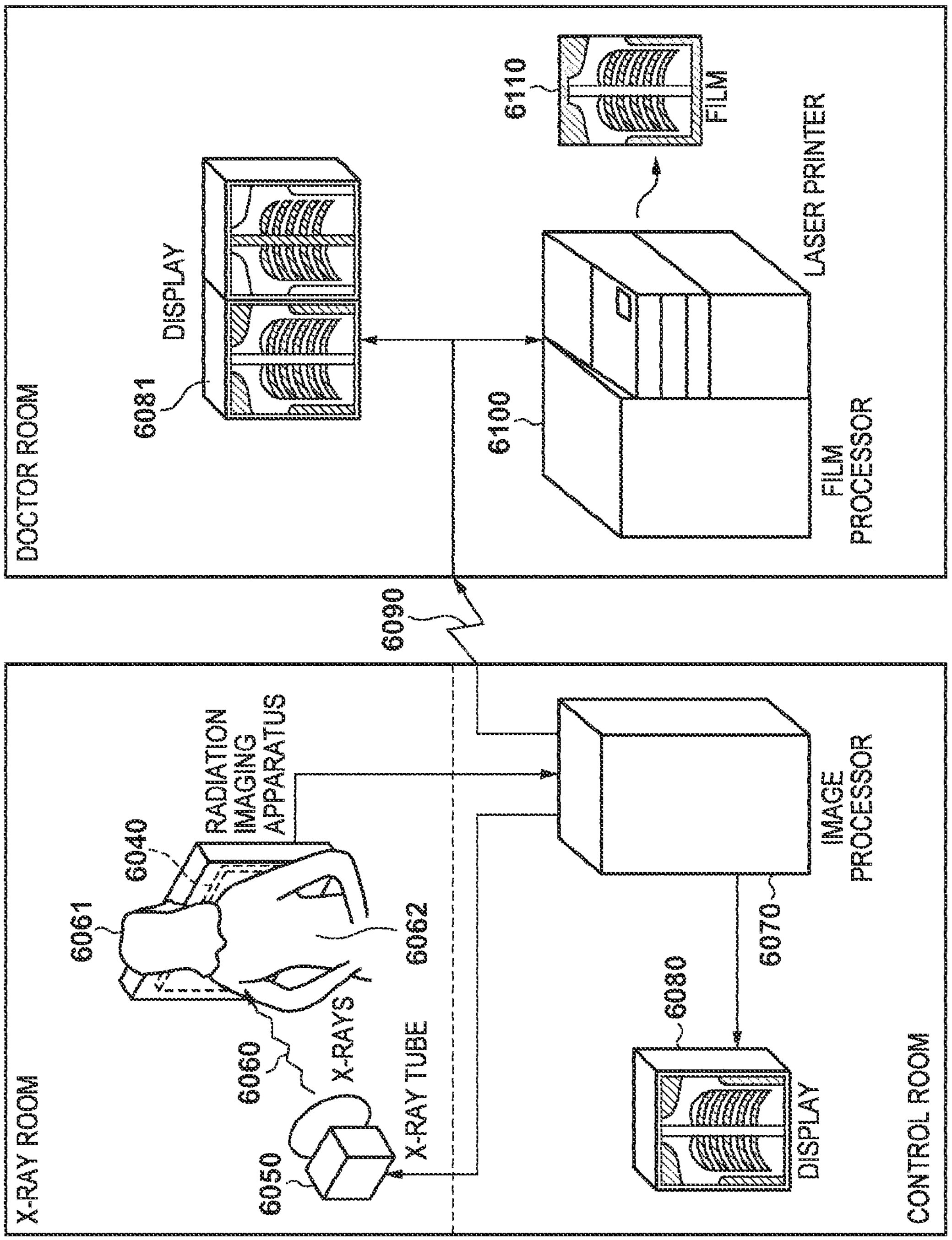
FIG. 21 is a diagram showing an example of a configuration of a radiation imaging system.

Hereinafter, with reference to FIG. 21, an example will be described in which the radiation imaging apparatus 200 is applied to a radiation imaging system. X-rays 6060 emitted by an X-ray tube 6050, which is a radiation source, pass through a chest portion 6062 of a patient or examination subject 6061 and are incident on a radiation imaging apparatus 6040, which is represented by the above-described radiation imaging apparatus 200. The incident X-rays include information about the interior of the body of the examination subject 6061. The scintillator 216 emits light in correspondence with the incident X-rays, the light is photoelectrically converted using photoelectric conversion elements, and thereby electrical information is obtained. This information is digitally converted, is subjected to image processing by an image processor 6070, which is a signal processing means, and can be observed using a display 6080, which is a display means in a control room.

Also, the information can be transferred to a remote location by a transmission processing means such as a telephone line 6090, can be displayed on a display 6081, which is a displaying means, in a doctor room or the like at the other location, or stored in a storing means such as an optical disk, and a doctor at the remote location can also perform diagnosis. The information can also be recorded on film 6110, which is a recording medium, by a film processor 6100, which is a recording means.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-094874, filed May 1, 2014, which is hereby incorporated by reference herein in its entirety.

What is claimed is:

1. A radiation imaging apparatus, comprising:

a plurality of conversion elements configured to convert radiation into an electric signal to obtain a radiation image;

a sensor for monitoring radiation;

a processing unit configured to process signals output from output electrodes of the plurality of conversion elements and an output electrode of the sensor; and a shield, wherein the signal output from the output electrode of the sensor is supplied to the processing unit via a signal line, and the shield is arranged such that capacitive coupling between the output electrodes of the plurality of conversion elements and the signal line is reduced.

2. The radiation imaging apparatus according to claim 1, wherein the shield includes a portion arranged between the output electrodes of the plurality of conversion elements and the signal line.

3. The radiation imaging apparatus according to claim 1, wherein the signal line is used for transmitting a signal from the output electrode of the sensor to the processing unit, and for transmitting a signal from the output electrode of at least one conversion element of the plurality of conversion elements to the processing unit.

4. The radiation imaging apparatus according to claim 1, wherein the signals output from the output electrodes of the plurality of conversion elements are transmitted to the processing unit via a column signal line, which is different from the signal line.

5. The radiation imaging apparatus according to claim 4, wherein in an orthogonal projection on a surface parallel to an imaging area in which the plurality of conversion elements are arrayed, the signal line does not overlap with the output electrodes of the plurality of conversion elements.

6. The radiation imaging apparatus according to claim 4, wherein the shield includes a portion arranged on the same layer as the output electrodes of the plurality of conversion elements.

7. The radiation imaging apparatus according to claim 1, wherein the shield includes a portion arranged on the same layer as a bias line for supplying a bias potential to the conversion elements and the sensor.

8. The radiation imaging apparatus according to claim 1, wherein the processing unit detects an electric signal that appears in the shield.

9. The radiation imaging apparatus according to claim 8, wherein based on the electric signal that appears in the shield, the processing unit corrects a signal obtained from the sensor.

10. A radiation imaging system, comprising:

a radiation source configured to generate radiation; and the radiation imaging apparatus according to claim 1.

* * * * *